United States Patent
Prendergast, Jr.

(10) Patent No.: US 11,410,249 B2
(45) Date of Patent: *Aug. 9, 2022

(54) GREENHOUSE AGRICULTURE SYSTEM

(71) Applicant: Edible Garden AG Incorporated, Belvidere, NJ (US)

(72) Inventor: Scott Edward Prendergast, Jr., Plano, TX (US)

(73) Assignee: Edible Garden AG Incorporated, Belvidere, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,537

(22) Filed: Oct. 20, 2021

(65) Prior Publication Data

US 2022/0164901 A1     May 26, 2022

Related U.S. Application Data

(63) Continuation of application No. 17/103,569, filed on Nov. 24, 2020, now Pat. No. 11,158,006.

(51) Int. Cl.
*G06Q 10/10* (2012.01)
*G06Q 50/02* (2012.01)
(Continued)

(52) U.S. Cl.
CPC ......... *G06Q 50/02* (2013.01); *G05B 19/4155* (2013.01); *G06N 20/00* (2019.01);
(Continued)

(58) Field of Classification Search
None
See application file for complete search history.

(56) References Cited

U.S. PATENT DOCUMENTS

| 3,719,301 A | 3/1973 | Boppart |
| 4,586,297 A | 5/1986 | Tagiasco |
| (Continued) | | |

OTHER PUBLICATIONS

T. Boulard et al. (Greenhouse crop transpiration simulation from external climate condition), Dec. 2000, Agricultural and Forest Meteorology, pp. 25-34. (Year: 2000).*

(Continued)

*Primary Examiner* — Romain Jeanty
(74) *Attorney, Agent, or Firm* — Knobbe, Martens, Olson & Bear LLP

(57) ABSTRACT

Methods and systems are disclosed configured to control the planting, application of pesticides, and harvesting of greenhouse crops, such as herbs. The greenhouse may include a variety of sensors, such as moisture sensors, ph sensors, and/or CO2 sensors. Unmanned vehicles may be utilized to capture crop images, and a learning engine may be used to determine the size of greenhouse crops. Such sensor data may be used to predict crop availability. A predication engine may be utilized to predict demand for greenhouse crops using current and historical orders for greenhouse crops. Greenhouse crop production instructions may be generated and transmitted to a greenhouse computer system to cause crops to be sown or harvested. Pallet loading instructions may be generated regarding the loading of specified quantities of crop packs on respective pallets for shipment to a destination.

26 Claims, 24 Drawing Sheets

(51) Int. Cl.
*H04L 67/125* (2022.01)
*G06Q 10/06* (2012.01)
*G06Q 30/02* (2012.01)
*G06Q 10/08* (2012.01)
*G06Q 30/06* (2012.01)
*G06N 20/00* (2019.01)
*G05B 19/4155* (2006.01)
*G06V 20/10* (2022.01)
*G06F 3/04847* (2022.01)

(52) U.S. Cl.
CPC . *G06Q 10/06312* (2013.01); *G06Q 10/06315* (2013.01); *G06Q 10/083* (2013.01); *G06Q 10/0875* (2013.01); *G06Q 10/10* (2013.01); *G06Q 30/0202* (2013.01); *G06Q 30/0633* (2013.01); *G06V 20/188* (2022.01); *H04L 67/125* (2013.01); *G05B 2219/32302* (2013.01); *G06F 3/04847* (2013.01)

(56) References Cited

U.S. PATENT DOCUMENTS

| | | |
|---|---|---|
| 4,689,067 A | 8/1987 | Kuckens |
| 8,350,490 B2 | 1/2013 | Browne |
| 8,643,495 B2 | 2/2014 | Lan |
| 9,243,789 B1 | 1/2016 | Chow |
| 11,138,677 B2 * | 10/2021 | Perry ............... G06F 3/0482 |
| 2007/0260400 A1 | 11/2007 | Morag et al. |
| 2010/0038440 A1 | 2/2010 | Ersavas |
| 2013/0113924 A1 | 5/2013 | Moon |
| 2015/0138569 A1 | 5/2015 | Li et al. |
| 2015/0164009 A1 | 6/2015 | Chandran et al. |
| 2015/0282440 A1 | 10/2015 | Shelor |
| 2016/0275580 A1 * | 9/2016 | Uechi ............. G06Q 10/06315 |
| 2016/0349769 A1 | 12/2016 | Lee |
| 2017/0311550 A1 | 11/2017 | Wei et al. |
| 2018/0255713 A1 | 9/2018 | Park |
| 2019/0170718 A1 | 6/2019 | Miresmailli et al. |

OTHER PUBLICATIONS

Kenneth et al., "Precision Farming From Rockwell", 1996, IEEE, pp. 1-5 (Year: 1996).

Miguel et al "Hydroponic Greenhouse Crop Optimization", Jun. 2018, APCA International Conference on Automatic Control and Soft Computing (CONTROLO), pp. 270-275 (Year: 2018).

Sindhuja et al., "A review of advanced techniques for detecting plant diseases", 2010, Elsevier, pp. 1-13 (Year: 1996).

* cited by examiner

FIG. 3N

PALLET 3 OF 3

Generic Customer Info

DELIVERS 11/13/2020

5 GG-SAG-POT-6PK
18 GG-THY-POT-6PK
12 GG-CIL-POT-6PK
12 GG-MIN-POT-6PK
6 GG-DIL-POT-6PK
6 GG-ORE-POT-6PK
2 GG-CHI-POT-6PK

3 TOTAL PALLETS

PO# 08659322

PALLET 3 OF 3

Sticking (Yellow Flags)

| | | | | | |
|---|---|---|---|---|---|
| [144] DS | Rosemary 'Tusc Blue' (Wk 40 - 28 trays) | 28 | Zone 6 | 0.3 | From [144] - S37 | 6,871 |
| [144] DS | Rosemary 'Tusc Blue' (Wk 41 - 34 trays) | 20 | Zone 6 | 0.2 | From [144] - S37 | 6,871 |
| [72] DS | Sage, (Wk 41- 13 trays) | 21 | Zone 5 | 0.3 | From [50] - S37 | 1505 |
| [128] DS | Thyme 'English' (Wk 41-17 trays) | 57 | Zone 5 | 0.7 | From [128] - S37 | 3,656 |
| [128] DS | Oregano, (Wk 40 - 10 trays) | 11 | Zone 5 | 0.1 | From [128] - S37 | 1450 |

4" Pinch to Shape (Blue Flag)

Z5 S37- Week 41 - [144] Rosemary Drwn TuscBlue' - (14 trays)

4" Moving (Pink Flags)

Z5 S37- Week 43 Mint ( 3 tables) -> S41
Z5 S41 - Week 41 Rosemary (6 Tables) -> Z7 S51

4" Move & Space (Pink/ Purple Flags)

Z5 S41- Week 42 TP Thyme-drwn/hishtil (6 tables) -> Z7- S48 Spacing 6/3
Z5 S40- Week 42 Sage (9 Tables) -> Z5 S42
Z5 S39- Week 43 TP Oregano (2 tables) -> Z7- S50 Spacing 6/3

Space on Tables (Purple Flag)

Z8 S57 - Week 41- 10" CB Basil - (7 tables) -> Z8- S56.

FIG. 3R-1

Week 45 Production (11/02/20) -

| Size - Action | Item | Amount | Amount TP | TP Date | Location | # Tables | Notes | Scheduled # Pots/Cells | Actual Yield | | # Pots |
|---|---|---|---|---|---|---|---|---|---|---|---|
| 4" Sq. - Sow | Basil - Dolce Fresca {ST} | 833 | | | Zone 5 | | Sow Monday | | | # Pots | 156000 |
| 4" Sq. - Sow | Basil - Dolce Fresca {ST} | 777 | | | Zone 5 | | Sow Thursday | | | # Pots | 140000 |
| 4" Sq. - Sow | Cilantro | 499 | | | Zone 5 | | | | | # Pots | 8985 |
| 4" Sq. - Sow | Dill | 43 | | | Zone 5 | | | | | # Pots | 770 |
| 4" Sq. - Sow | Parsley | 328 | | | Zone 5 | | Sow Monday | | | # Pots | 6803 |
| 4" Sq. - Sow | Chives (Clean steam before sowing) Use 200 gram | 35 | | | Zone 5 | | Sow more seed/pot | | | # Pots | 636 |
| 6" Pre - Sow | Basil - Dolce Fresca {ST} | 58 | | | Zone 5 | 0.7 | Sow Mon/Tues | | | # Pots | 380 |
| 170 - Sow | Basil - Dolce Fresca {ST} | 248 | | | Zone 6 | 3.1 | Sow Mon/Tues | | | # Pots | 17852 |

Conventional Crop (Use Conventional Media)

| | | | | | | | | | | | |
|---|---|---|---|---|---|---|---|---|---|---|---|
| 10" CB - Sow | Basil - Dolce Fresca {ST} | | | | Zone 8 | 0.0 | Sow Monday | | | # Cells | |

Transplant from Cuttings ...

| | | | | | | | | | | | |
|---|---|---|---|---|---|---|---|---|---|---|---|
| 4" Sq. - TP | Thyme DRWN (Wk 41 - 47 trays) 2 plants/pot | 167 | | | Zone 5 | 1.9 | From [120] - 536 | 3,008.00 | | | |
| 4" Sq. - TP | Rosemary (DRWN TuscBlue - Wk 39 - 40 trays) | 160 | | | Zone 5 | 1.8 | From [144] - 536 | 2,880 | | | |
| 4" Sq. - TP | Rosemary (DRWN TuscBlue - Wk 40 - 40 trays) | 320 | | | Zone 5 | 3.6 | From [144] - 536 | 5,760 | | | |
| 4" Sq. - TP | Sage - Berwin (Wk 40 - 30 trays) | 120 | | | Zone 5 | 1.3 | From [72] - 537 | 2,160 | | | |
| 4" Sq. - TP | Oregano House - Wk 40 - 10 trays) | 71 | | | Zone 5 | 0.8 | From [120] - 536 | 1280 | | | |

FIG. 3R-2

| Date | Day | Zone 5 | Zone 9/10 | Zone 7 | Conventional Zone 8 | Zone 6 Hydro Conventional |
|---|---|---|---|---|---|---|
| 11/2/20 | Monday | | Pygnic (0.5 oz/gal) - All Herbs Loading Tuesday/Wednesday - Spray - John | | | Ranman (3.0 oz/2.5 L) Per Fogger - Use 1 Fogger - Fog - Z6 |
| 11/3/20 | Tuesday | Mycotrol ESO (40 oz/100gal) Ag Aide 6oz/100gal - Zone 5 - Spray - Michael | | Mycotrol ESO (40 oz/100gal)/Actinovate (12oz/100 gal)/ Ag Aide 6oz/100gal - Zone 7 - Spray - Ryan | Ancora (8.5oz/13.5L) Azatin-O (6oz/13.5L) Per Fogger - Use 2 Foggers - Fog 28 | |
| 11/4/20 | Wednesday | Zerotol (4oz/1 L) Use 2 Foggers - Fog Z5, 9,10 Acramite (7.5 oz/13.5L) per Fogger - Use 2 Foggers - Fog Z5, 9,10 | Pygnic (0.5 oz/gal) - All Herbs Loading Thursday/Friday - Spray - John Mycotrol ESO (40 oz/100gal) Ag Aide 6oz/100gal - Cilantro/Parsley/Chives Spray - John | Triathlon (128oz/100gal) Ag Aide 6oz/100gal - All cuttings/TP Herbs - Z5/7 Spray - Ryan | | |
| 11/5/20 | Thursday | | Azatin-O (12oz/100gal) - Under Bench Spray - All Zone 5 - Michael | | | |
| 11/6/20 | Friday | | Pygnic (0.5 oz/gal) - All Herbs Loading Sunday/Monday - Spray - Ryan | Kopa (100 oz/100 gal) - BIO Ag Aide - Z7 All - Spray - Ryan | | Dipel Fog (5oz/13.5L) Azatin-O (6oz/13.5L) Per Fogger - Use 1 Fogger - Fog - Z6 |
| 11/7/20 | Saturday | | Kopa (100 oz/100 gal) - BIO Ag Aide - Cilantro/Parsley/Chives - Z9/10 - Spray - Ryan | | | Ancora (10oz/13.5 L) Azatin-O (6oz/13.5L) Per Fogger - Use 1 Fogger - Fog Z6 - Botrytis |
| 11/8/20 | Sunday | | | | | |

FIG. 3S

| 4" Crop | DP Amt. (From weekly reports) | Amt. Total (From Mon. Inv.) | Amt. Per Crop Week (From Mon. Inv.) | Week Numbers Available | Notes |
|---|---|---|---|---|---|
| Basil | | 47,304 | 21,312 / 25,992 | 39,40 | |
| Chives | | 3,708 | 324 / 1152 / 1152 / 1080 | 34,35,36,37 | |
| Cilantro | | 14,249 | 6941 / 7308 | 39,40 | |
| Dill | | 2,277 | 1215 / 1062 | 40,41 | |
| Mint | | 4,428 | 288 / 4140 | 41,42 | |
| Oregano | | 7,049 | 5382 / 1667 | 38,39 | |
| Parsley | | 9,396 | 3492 / 5904 | 38,39 | |
| Rosemary | | 23,571 | 594 / 3240 / 9090 / 10647 | 25,30,31,32 | |
| Sage | | 1,755 | 1,755 | 38 | |
| Thyme | | 6,096 | 270 / 1859 / 1463 / 2504 | 33,34,35,38 | |

FIG. 3T

GREENHOUSE AGRICULTURE SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to computer-based methods and systems of managing greenhouse and the sowing and harvesting of greenhouse produce.

Description of the Related Art

Conventional approaches to sowing, harvesting, and delivering produce in a greenhouse environment fail to ensure that there are adequate, yet non-wasteful, amounts of produce planted or harvested in order to satisfy actual or anticipated produce demand. Such conventional approaches further fail to adequately address changing environmental conditions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a networked greenhouse control system, the networked greenhouse control system comprising: a network interface configured to communicated over a network with a plurality of greenhouse computer system; at least one processing device operable to: receive, from a remote enterprise resource planning system, orders for greenhouse crops; utilize a demand planning engine to predict demand for greenhouse crops based at least in part on the orders for greenhouse crops from the remote enterprise resource planning system; based at least in part on the predicted demand for greenhouse crops from the demand planning engine, generate crop production instructions regarding one or more greenhouse crops, wherein the instructions include at least crop sowing instructions and/or crop picking instructions configured to cause crops to be respectively sown or picked in one or more greenhouses; transmit the crop production instructions to a greenhouse computer system; generate, based at least in part on the orders for greenhouse crops from the remote enterprise resource planning system, pallet loading instructions comprising instructions to load specified quantities of crop packs on respective pallets for shipment to a destination; access, for a first pallet, corresponding pallet loading instructions, an identifier associated with a recipient of the first pallet, a delivery date associated with the first palette, and an order identifier; generate, based at least in part on the pallet loading instructions, the identifier associated with the recipient of the first pallet, the delivery date associated with the first palette, and the order identifier, a placard configured to be affixed to the first palette; access greenhouse inventory data; utilize the greenhouse inventory data to populate crop pick instructions and a dump user interface; and transmit the crop pick instructions to the greenhouse computer system to thereby effect a corresponding harvest of crops.

An aspect of the present disclosure relates to a computerized method, the method comprising: receiving over a network at a first computer system comprising one or more computing devices, orders for greenhouse crops; predicting demand for greenhouse crops based at least in part on the orders for greenhouse crops received over the network; based at least in part on the predicted demand for greenhouse crops, generating crop production instructions regarding one or more greenhouse crops, wherein the instructions include at least crop sowing instructions and/or crop picking instructions configured to cause crops to be respectively sown or picked in one or more greenhouses; transmitting the crop production instructions to a greenhouse computer system; generating, based at least in part on the orders for greenhouse crops received over the network, pallet loading instructions comprising instructions to load specified quantities of crop packs on respective pallets for shipment to a destination; and transmitting the pallet loading instructions to the greenhouse system to cause crops to be loaded onto pallets in accordance with the pallet loading instructions.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
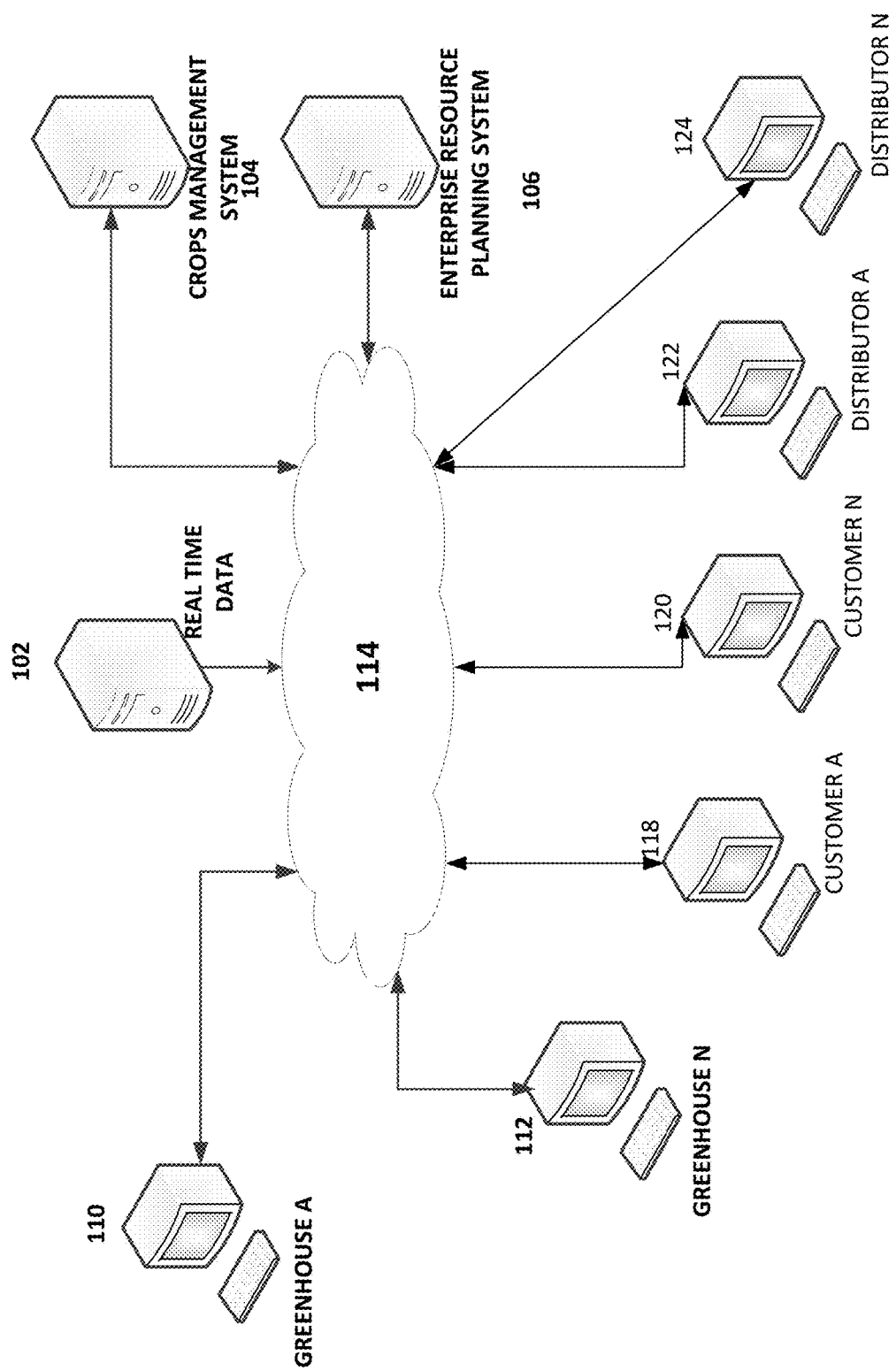
FIG. 1A is a block diagram illustrating an example embodiment of an operating environment.

An aspect of the present disclosure relates to systems and methods configured to manage greenhouse crop harvest, yields and transport timing and yields, and that utilize predictions and demand data to perform crop allocations to customers.

As will be described, crop data is recorded and tracked with high accuracy, thereby enabling accurate predictions and determinations as to how much of a given crop will be available at a given point in time. Further, based on the monitoring of environmental conditions, a determination may optionally be made as whether previous crop yield predictions need to be modified. Yet further, using the foregoing predications and known or predicted demand, a determination may be made, for a given point in time, whether the crop yield will be sufficient to satisfy the demand. Still further, when a determination is made that the predicted crop yield is insufficient to meet known or predicted demand, the system may identify alternative sources of crops to satisfy the shortfall, and may direct transport vehicles to transport crops from such alternative sources to designated destination. Aspects of the disclosure relate to the efficient packing of crop trays for transport to destinations.

Aspects of a greenhouse environment will now be described. A greenhouse may include one or more freestanding structures or two or more table, pond or zones or structures. The greenhouse roof and/or walls (e.g., glass, which may optionally be tempered glass, double walled polycarbonate, double walled polyethylene greenhouse with an air space between the two poly layers) provide light penetration as well as isolation from the outside elements (e.g., rain, snow, hail, the sun, wind, too hot temperatures, and/or two cold temperatures). The greenhouse may include environmental controls and feeding systems to enable crops to be grown. For example, a greenhouse may include heaters and evaporative coolers (e.g., to maintain the interior temperature within a desired range), evaporative cooling walls (configured to provide air into the greenhouse that is cooler than outside air), misters, fans (e.g., vertical air flow fans, horizontal air flow fans, gable fans, etc.), feed systems, and environmental controllers.

The greenhouse may include grow lights (e.g., CFL Full Spectrum lights). In addition, the greenhouse may include a bench system that supports crops at a working height. Optionally, troughs, pitched from an irrigation water supply end to a sump, may be provided for pot-based production.

The greenhouse may utilize a tray system. The trays may be loaded with potted plants or flats may be shipped directly to customers. A given tray may be of any dimension. A tray transport system may be in the form of a roller conveyor system, a frame slide bed conveyor system, a turning and incline conveyor system, and/or a plastic roller gravity conveyors system.

The greenhouse may optionally include one or more sensor types (which may be wired or wireless (e.g., Wi-Fi, Bluetooth, Zigbee, etc.) sensors). For example, moisture detection sensors may be placed in the soil to measure moisture content. $CO_2$ sensors may be utilized to measure $CO_2$ levels and to detect if the $CO_2$ levels go above or below certain thresholds. Water pH level sensors may be placed in irrigation water as its runs through pipes or other water transport to detect over-acidic or under-acidic water conditions (which may cause nutrient deficiencies). The sensor readings may also be used to track, timestamp, and record interior and/or exterior temperatures, humidity, sunlight intensity, and/or rain.

Equipment monitoring sensors may be placed on misting and irrigation systems to monitor the performance of pumps and pressure lines. Airflow sensors may be located on vented roofs, side vents and fans and may be used to detect whether fans have stopped running or are running outside of certain specified parameters. Greenhouse temperature sensors may be used to measure internal temperatures in the greenhouse, and to detect when the temperature is a above a first defined threshold and/or below a second defined threshold.

Cameras may be used to capture images of the greenhouse crops, and the images may be used to determine the crop health, size, color, estimated weight, and/or readiness to harvest. The camera(s) may be mounted to an unmanned vehicle (e.g., an unmanned aerial vehicle (UAV), an unmanned ground-based vehicle, an unmanned vehicle running on raised tracks, or the like, which may be referred to herein as drones). The drones may be autonomous and configured to fly along a pre-specified flight path. The drones may in addition or instead be remotely navigated by a remote drone control ground station system. The drones may be manually navigated by an operator using a remote control device.

The greenhouse may optionally include automated watering equipment, automated pesticide spray equipment, automated crop picking equipment, climate control equipment, crop spacing equipment, packaging equipment, and/or pallet loading equipment. The automated equipment may be controlled in whole or in part via the instructions discussed herein.

An example system architecture that may be utilized to provide crop management services (including crop demand forecasting, crop inventory tracking, readiness to harvest, differences between demand and crop availability, routing, and/or exception condition handling) will now be discussed with reference to FIG. 1A. The various systems and devices may communicate with each other over one or wired and/or wireless networks 114 (e.g., the Internet, Ethernet, or other wide area or local area network). In the illustrated embodiment, a crop management system 104 may be hosted on one or more servers. The crop management system 104 may be cloud-based and may be accessed by one or more greenhouse computer systems 110, 112 (e.g., associated with greenhouse operators) over a network 114. Greenhouse computer systems 110, 112 may be able to share software applications, computing resources, and data storage provided by the crop management system 104. In addition, one or more customer systems 118, 120 (e.g., associated with entities, such as supermarkets or stores that have supermarket departments that sell to consumers) and one or more distributor computer system 122, 124 (e.g., associated with entities that distribute crops to supermarkets or stores that have supermarket departments).

The greenhouse computer systems may be in the form of a desktop computer, laptop computer, tablet computer, mobile phone, smart television, cloud-based system, and/or other computing system. A greenhouse computer system may include user input and output devices, such a displays (touch or non-touch displays), speakers, microphones, trackpads, mice, pen input, printers, haptic feedback devices, cameras, and the like. A greenhouse computer system may include wireless and/or wired network interfaces via which the greenhouse computer system may communicate with the crop management system 104 over one or more networks and with one or more greenhouse sensors, such as those discussed elsewhere herein. A greenhouse computer system may optionally include a local data store that may store customer and distributor contact information, order histories, sow data, dump date, pick data, call sheets, production schedules, and/or other data discussed herein, which may also be stored on, and synchronized with, a cloud data store associated with the crop management system 104.

User interfaces described herein are optionally configured to present data in real time from sources described herein, and user edits may be displayed and propagated in real time to other user interfaces, data stores, and data consumers. The user interfaces may present controls and interfaces to further ease the management of crops and ensure the accuracy of crop management data.

Optionally, a version of the user interfaces described herein may be enhanced for use with a small screen (e.g., 4 to 10 inches diagonal), such as that of a mobile phone or small tablet computer. For example, the orientation of the controls may be relatively more vertical rather than horizontal to reflect the height/width ratio of typical mobile device display. Further, the user interfaces may utilize contextual controls that are displayed in response to an inferred user desire, rather than displaying a large number of tiny controls at the same time (which would make them hard to select or manipulate using a finger).

The crop management system 104 may provide tools to graphically generate certain models, such as those configured to perform demand planning, provide real time snapshots of greenhouse availability, identify and depict sales trends, and/or the like.

The crop management system 104 may optionally generate, based on order data from an enterprise resource system 106 (or other system) and/or call sheet data (discussed elsewhere herein) placards (which may be printed out and used with respect to crop shipments). The crop management system 104 may optionally generate pallet loading data (e.g., specifying how many cases of one or more types of crops are to be loaded onto a given pallet) based on order data from an enterprise resource system (or other system) and/or call sheet data.

In addition, based on customer orders (which may include direct to store delivery (DSD) orders and non-DSD orders), greenhouse data, and/or historical demand data, customer provided dynamic forecasting reports, the crop management system 104 may generate demand planning predictions. The demand planning predictions may in turn be utilized to generate production schedules for greenhouses (e.g., daily, weekly, monthly, and/or seasonal production schedules).

Real time data may be received from one or more systems and/or devices 102 (e.g., sensor data, weather data, etc.). Such real time data may be utilized in generating crop production and availability predictions, and may be used by a demand planning engine comprising a demand planning algorithm. For example, the sensors may include moisture detection sensors placed in the crop soil to measure moisture content, $CO_2$ sensors to measure $CO_2$ levels, water pH level sensors placed in irrigation water to detect over-acidic or under-acidic water conditions, airflow sensors (e.g., located on greenhouse vented roofs, side vents and fans and which may be used to detect whether the fans have stopped running or are running outside of certain specified parameters). Data from the sensors and/or other real time data sources (e.g., weather data providing temperature and humidity data in areas where greenhouses are located and/or along a route via which crops are to be transported) may be used to estimate crop yields, the likelihood of damage to crops being transported to distribution centers or stores, and to determinate if crop availability will satisfy known and/or predicted demand for such crop. In addition, some or all of the foregoing data may be utilized by an environmental impact algorithm, as discussed elsewhere herein. Some or all of the information generated by the crop management system 104 may be provided to the enterprise resource planning system, greenhouse systems, customer systems, and/or distributor systems.

Optionally some or all of the services provided by the crop management system 104 may be accessed via one or more APIs by authorized third party systems. The crop management system 104 may optionally generate directives in the form of routing instructions.

For example DSD customers may be assigned to one or more day/route delivery combinations. As the DSD orders are received by the system, the system may generate a DSD Call Sheet (e.g., a daily DSD Call Sheet) which defines the packout crops to be transported on a specified route and the corresponding delivery schedule. A given route may be assigned to a driver and/or vehicle (e.g., which optionally may be an autonomous, self-driving vehicle configured to execute the route instructions). The driver or autonomous, self-driving vehicle will then drive the route and deliver the crops to customers on the route in accordance with the delivery schedule.

Figure 1B:
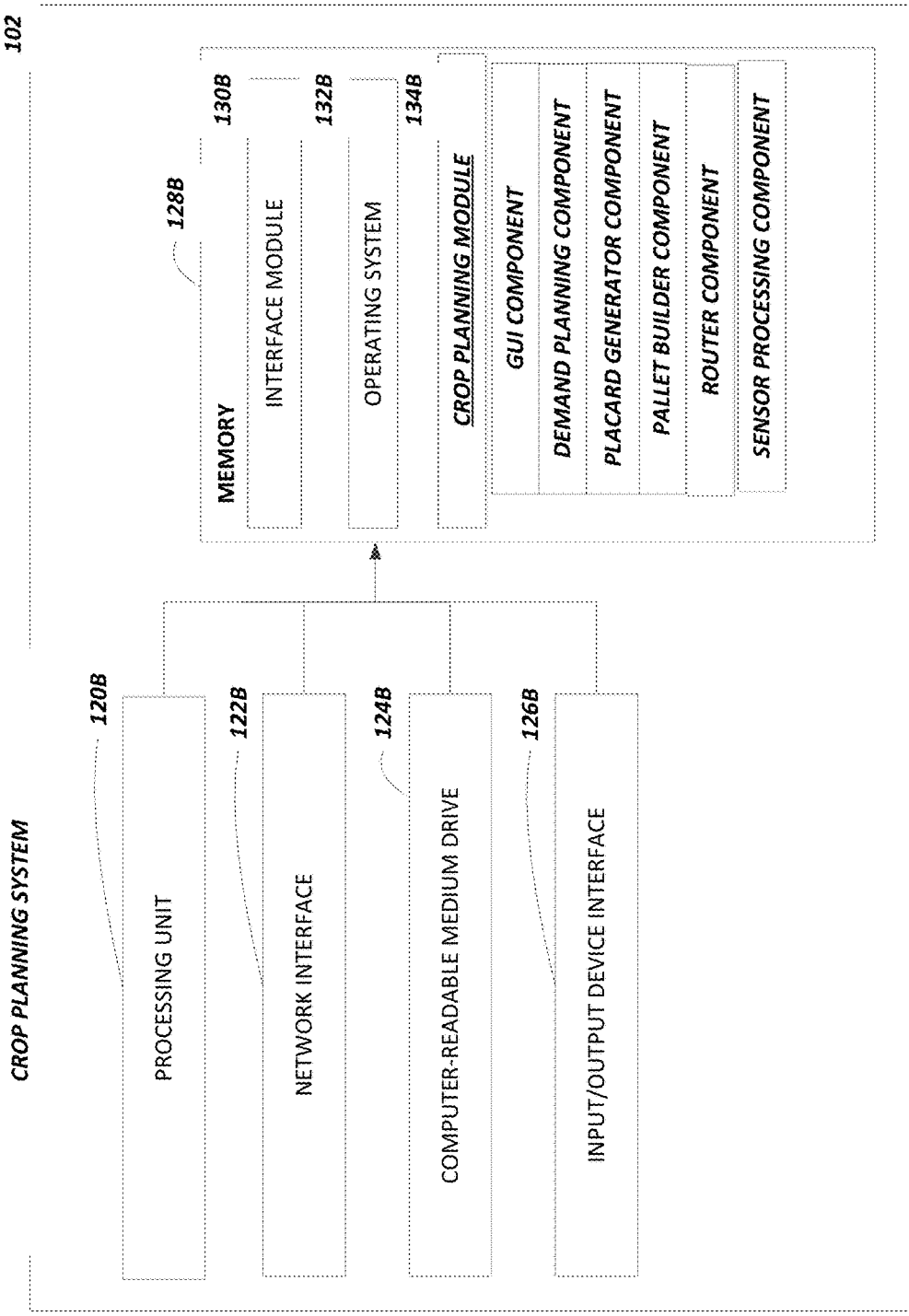
FIG. 1B is a block diagram illustrating an embodiment of example components of a crop management computing system capable of providing product customization services.

FIG. 1B is a block diagram illustrating an embodiment of example components of the example crop management system 104. The crop management system 104 includes an arrangement of computer hardware and software components that may be used to implement aspects of the present disclosure. Those skilled in the art will appreciate that the example components may include more (or fewer) components than those depicted in FIG. 1B.

The crop management system 104 may include one or more processing units 120B (e.g., a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses. The network interface 122B may provide connectivity to and communications with one or more networks or computing systems (e.g., greenhouse systems/devices, sensors, customer systems/devices, distributor systems/devices, enterprise resource planning systems/devices, real time data systems/devices, etc.). The processing unit 120B may thus communicate information and instructions to and/or from other computing devices, systems, or services via a network. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, other sensors, etc.

The memory 128B may contain computer program instructions that the processing unit 120B may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of the crop planning module 134B, including it components. The memory 128B may store user accounts for greenhouse operators, customers, distributors, and/or other entities. A user account may include, for example, contact information (e.g., email address, phone number, physical address), billing data, and/or other data. Optionally, in addition or instead, the data may be stored remotely on a cloud-based or other networked data store. The account data may optionally be stored in a relational database, an SQL database, a NOSQL database, a hierarchical database, an object oriented database, a graph database, and/or other database type.

For a greenhouse operator, the account data may also include, by way of example, the number of greenhouses, the size of the greenhouses, the configuration of the greenhouse (e.g., internal layout, presence of heating equipment, cooling/airflow equipment, irrigation equipment, tray/case handling systems, loading area data for shipping, etc.), the types and/or quantities of crops currently being grown, historical data on the types and/or quantities of crops previously grown and harvested, preferred tray size, preferred shipping containers, shipping data, and/or other data (e.g., other data discussed herein).

For a customer, the account data may also include, by way of example, the current orders for crops (e.g., including crop types, quantities, purchase prices, date orders placed, crop delivery dates, delivery address, etc.), predicted crop orders (e.g., including crop types, quantities, purchase prices, date orders placed, crop delivery dates, delivery address, etc.), and historical crop orders (e.g., including crop types, quantities, purchase prices, date orders placed, crop delivery dates, delivery address, etc.). In addition, customer logos and/or trademarks (which may be printed on placards for use with pallets, as described elsewhere herein) may be stored in the account. A distributor may be part of the same entity as one or more customers. For example, a distributor may receive bulk shipments of crops, and then forward selects portions of the delivery to different supermarkets (where the distributor and the supermarkets may be part of the same overall company). The account data for a distributor may include some or all of the same type of data as for customers and/or different data (e.g., an identification of the supermarkets to whom the distributor ships crops, the distributor warehouse size, etc.).

The memory 128B may include an interface module 130B. The interface module 130B can be configured to facilitate generating one or more interfaces through which a compatible computing device, may data send to, or receive data from the crop planning module 134B.

The modules or components described above may also include additional modules or may be implemented by computing devices that may not be depicted in FIGS. 1A and 1B. For example, although the interface module 130B and the crop planning module 134B are identified in FIG. 1B as single modules, the modules may be implemented by two or more modules and in a distributed manner. By way of further example, the processing unit 120B may include a general purpose processor and a graphics processing unit (GPU). The crop management system 104 may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the crop management system 104 and their components can be implemented by network servers, application servers, cloud-base systems, database servers, combinations of the same, or the like, configured to facilitate data transmission to and from data stores, greenhouse computer systems, and third party systems via one or more networks. Accordingly, the depictions of the modules are illustrative in nature.

Figure 2:
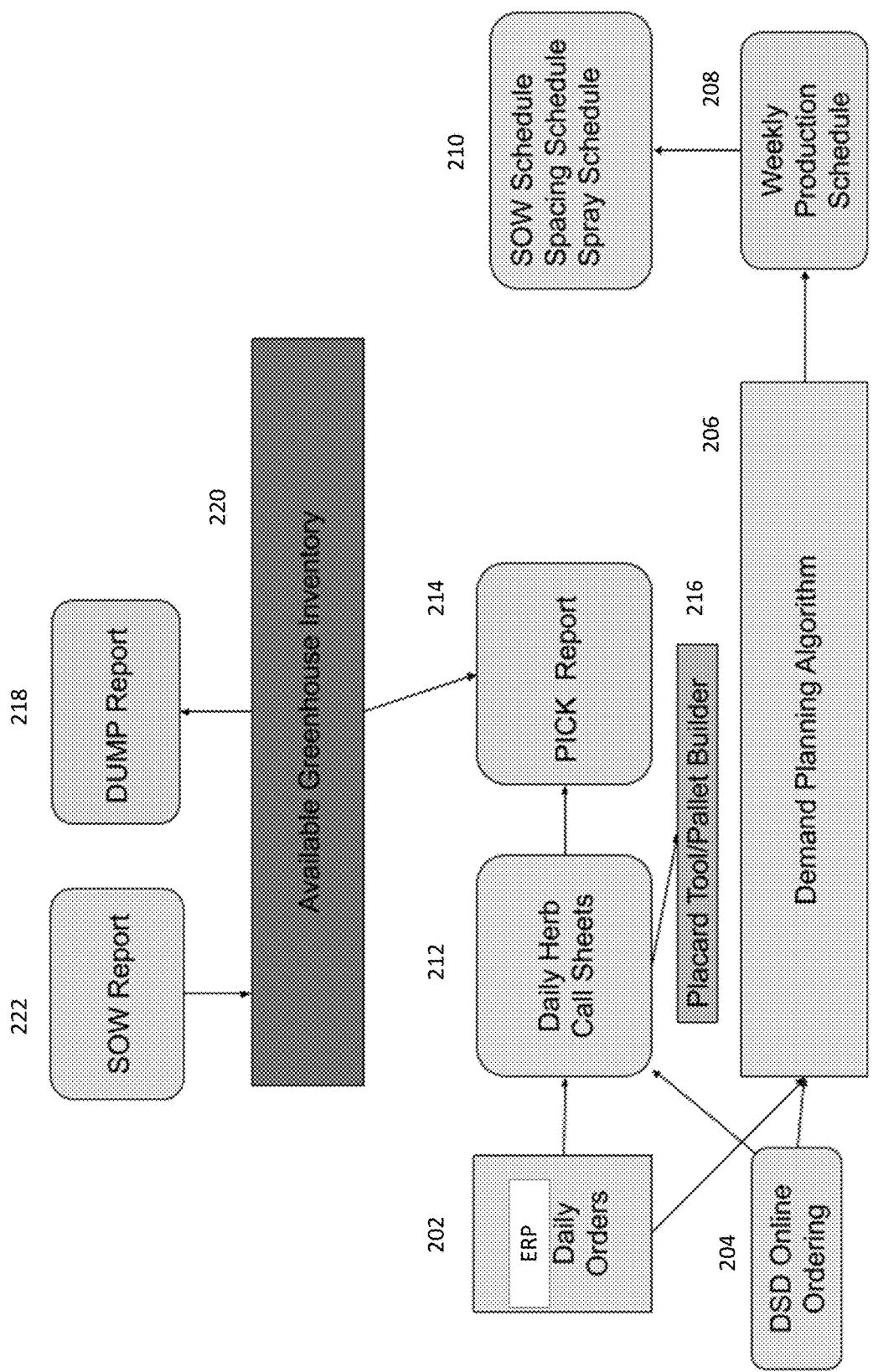
FIG. 2 illustrates an example process.

FIG. 2 illustrates an example software architecture and data flow. Periodic (e.g., hourly, daily, weekly, or other time period) orders 202 may be received from an enterprise resource planning (ERP) system at a crop management system. In addition, orders 204 may be received from direct to store delivery (DSD) customer systems. The order data may include crop/product types, quantity, order date, deliver date(s), price(s), and shipment location(s).

The order data from the ERP system and/or the DSD system may be utilized by a demand planning algorithm 206 and to populate call reports 212 (e.g., daily herb call sheets). As described in greater detail herein, the demand planning algorithm 206 may employ year-over-year sales of a given crop/product (e.g., customer specific and/or aggregate sales for all or a set of customers), trending demand projections vs actual ratio (Rolling Demand Factor—RDF), and/or rolling sales averages (RSA), to dynamically calculate the projected demand for each crop/product. The call report may be populated using the crop/product orders (sales data) from the ERP system and from the DSD customers. For example, a given order may be parsed by a computer system to identify the corresponding purchase order (PO) and crop (e.g., herb) totals. In addition, pallet maps and pallet placards 216 may be generated and which may be optionally printed. The call report 212 may in turn be utilized, in concert with available greenhouse inventory data 220, to populate a pick report 214 (which may include pick week dates, sow date, crop/product, and/or case quantity). The available greenhouse inventory data 220 may be populated at least in part using a sow report 222.

As described elsewhere herein, the output of the demand planning algorithm 206 may be utilized to generate a production schedule 208 (e.g., a daily, weekly, and/or monthly production schedule, which may also be referred to as a sow schedule). The production schedule 208 may in turn be utilized to generate one or more other schedules 210 (which may optionally be utilized to control or program automated greenhouse systems). For example, the production schedule 208 may be dynamically generated using the demand planning algorithm 206, and may then be used in defining the daily sow schedule for a corresponding time period (e.g., for each week). Example schedules 210 may include sow schedules, spacing schedules/reports, and/or crop spray schedules. By way of illustration, a spacing report may be a dynamically generated report that assigns the task of plant spacing based upon the spacing periods (e.g., days) in a corresponding time to finish (e.g., weeks to finish until the plant, such as an herb, is ready to be picked or otherwise harvested).

As noted above, available greenhouse inventory data 220 (which may include crop names and quantities of available greenhouse crop inventory) may be used to populate the pick report 214. In addition, available greenhouse inventory data 220 may be used to populate dump reports 218. As discussed elsewhere herein, a dump report 218 may be populated with a week number, sow date, crop type, tray type/count, quantity, dump date, zone/bay, and reason for dumping. For example, crop dumping may take the form of deliberate crop destruction to render the crop useless for consumption or processing. Dumping may be performed using one or more techniques such as grinding, burning, processing with chemicals, and/or soaking in water. Dumping may also take the form of free distribution of crops (e.g., to foodbanks).

Certain example user interfaces will now be described. User interface fields and table entries may be automatically populated from one or more data sources (e.g., databases or systems described herein) and/or may be populated via a user entry. The user interfaces may optionally be served by a web server hosted by the crop management system. Optionally instead, the user interfaces may be provided by a dedicated application hosted on a user device.

Figure 3A:
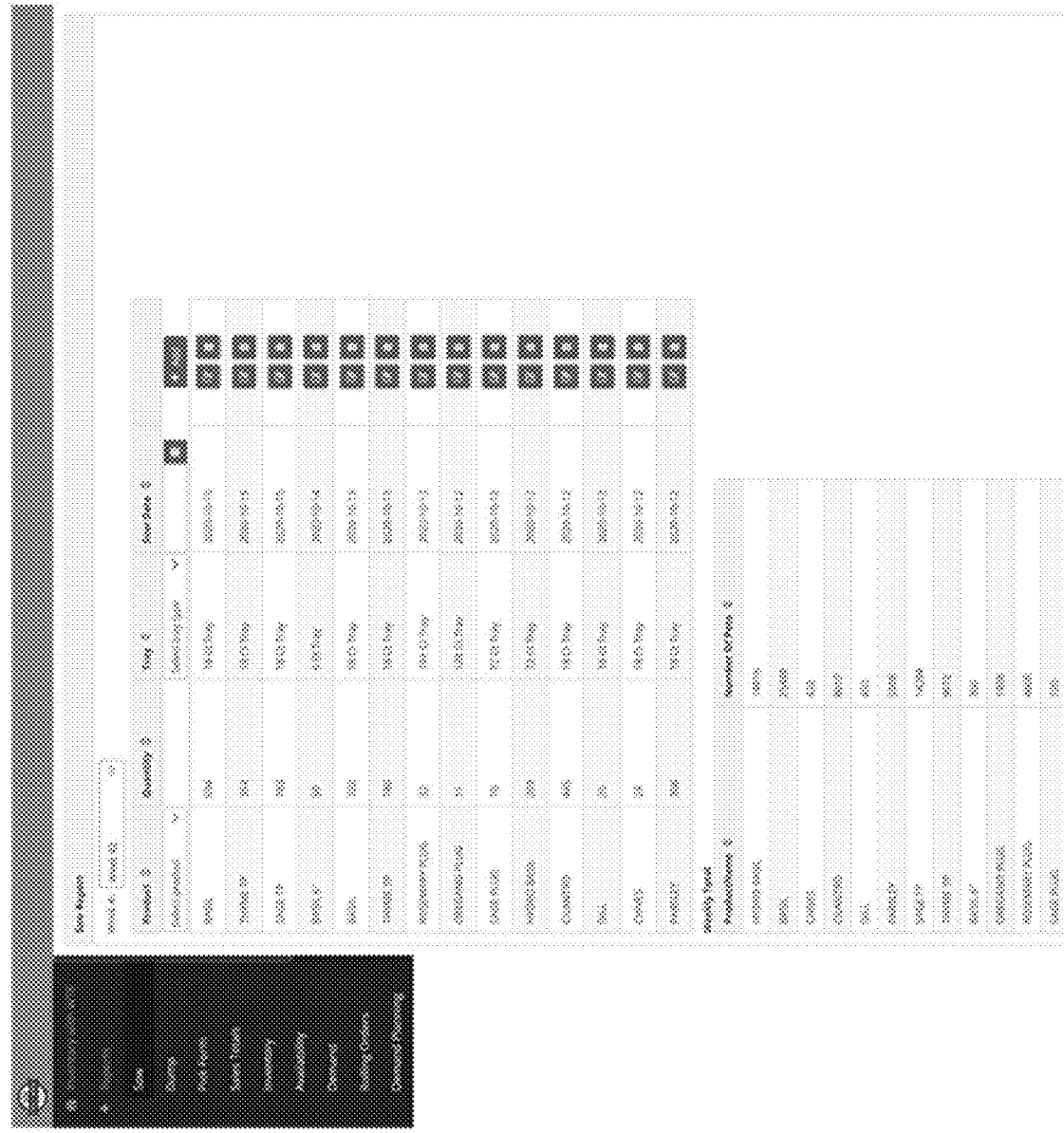
FIG. 3A-3T illustrate example user interfaces.

Referring now to FIG. 3A, an example sow report user interface is illustrated configured to receive crop sow totals for a given time period (e.g., day). The user interface provides controls (e.g., in the form of one or more drop down menus) via which a user may select or enter a week number (where the week number may be relative to January 1 of the current year), sow date, crop/product (e.g., basil, thyme tp (transplant), rosemary plug, oregano plug, dill, cilantro, chives, parsley, etc.), tray type/count (e.g., size of germination trays, such as 6 count, 8 count, 18 count, 72 count, 128 count, 144 count, etc.), and quantity. There may be multiple entries for different versions of the same crop (each transplant and non-transplant versions). Edit controls may optionally be provided that enable the user interface entries to be edited and that enable an entire row of entries to be deleted.

The input data regarding the crop(s) may be used to determine/calculate available inventory totals for a given crop. The available inventory totals may be stored in a crops availability database (e.g., associated with the crop management system), and used in generating crops availability reports. For example, the sow week+the "weeks to finish" (WTF) may be used to determine if a given crop will be available (e.g., ready to be harvested or transported to customer) for a given week. The report may show in table format, for each crop, how many pots and/or plants are available for the current week. Optionally, the table may be sorted in accordance with a selected column (e.g., ascending to descending or descending to ascending, in alphabetical order or reverse alphabetical order). For example, the table rows may be sorted by crop name or by pot quantities.

The crops availability reports (and other reports disclosed herein) may be transmitted as a file, or as a link to a file or record, to one or more recipients. Optionally, the report may be viewed via a dedicated application or via a Software as a Service webpage generated by a web server. The crop availability report may be used by the greenhouse staff or automated picking equipment to identify which SOW week crops should be picked each day for the Dailey crop (e.g., herb) call sheets.

A menu of user interfaces or sections may be provided on some or all of the user interfaces described herein that provide a link to the corresponding user interface. Thus, the user may quickly navigate to a described user interface from other user interfaces by selecting a corresponding menu entry.

Figure 3B:
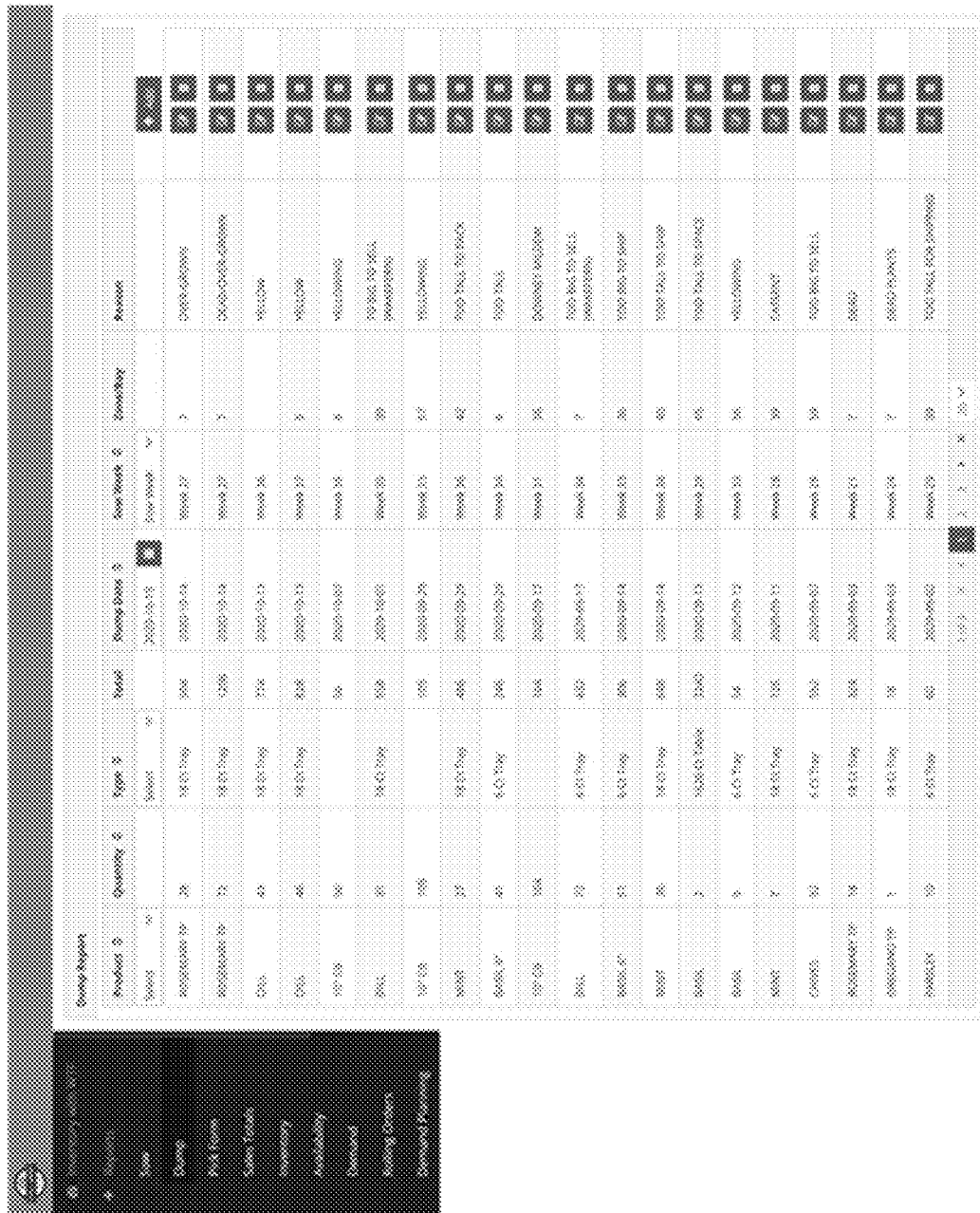

Referring now to FIG. 3B, an example dump report user interface is illustrated. The dump report user interface may enable a user to add or edit dump data, which may be used to remove crop entries from an inventory database and/or from one or more availability reports. For example, the user interface enables a user to select a time period (e.g., the week number), sow date, crop, tray type/count, quantity, dump date, zone/bay, and reason for dumping (which may be selected from a menu of predefined reasons for dumping the crop, such as overgrown, dead/overgrown, yellow, yellowing, too big to sell, too big to pack, too tall to space, too tall to pack, downy mildew, oversupply, etc.). The dump totals may be deducted from the crop inventory to provide real time crop availability.

Once entered via the dump report user interface, the crop may be correspondingly added (e.g., in response to a user activation of submit control) to the dump totals in a dumps database, and may be used in availability reports described herein. The dump report may show in table format, for each crop, the quantity being dumped, the quantity being dumped, the tray size being dumped, the sow week, the zone bay, and the dump reason for the selected week. Optionally, the table may be sorted in accordance with a selected column (e.g., ascending to descending or descending to ascending, in alphabetical order or reverse alphabetical order). For example, the table rows may be sorted by crop name or dump quantities. Edit controls may optionally be provided that enable entries to be edited and that enable an entire row of entries to be deleted.

Figure 3C:

Referring now to FIG. 3C, an example pick user interface is illustrated. The pick user interface enables a user to periodically (e.g., each day) enter pick data. The user interface may include a table, via which the user may select a crop/product for a given row, select the case quantity, select tray type/count, view the total (quantity×count) calculated by the system, select the pick date, and select the sow date/week. Once the foregoing data is submitted (e.g., in response to a user activation of submit control) the product(s) are added to the pick totals in the database addition, and the submitted data may be utilized in the availability reports. Edit controls may optionally be provided that enable entries to be edited and that enable an entire row of entries to be deleted.

Figure 3D:
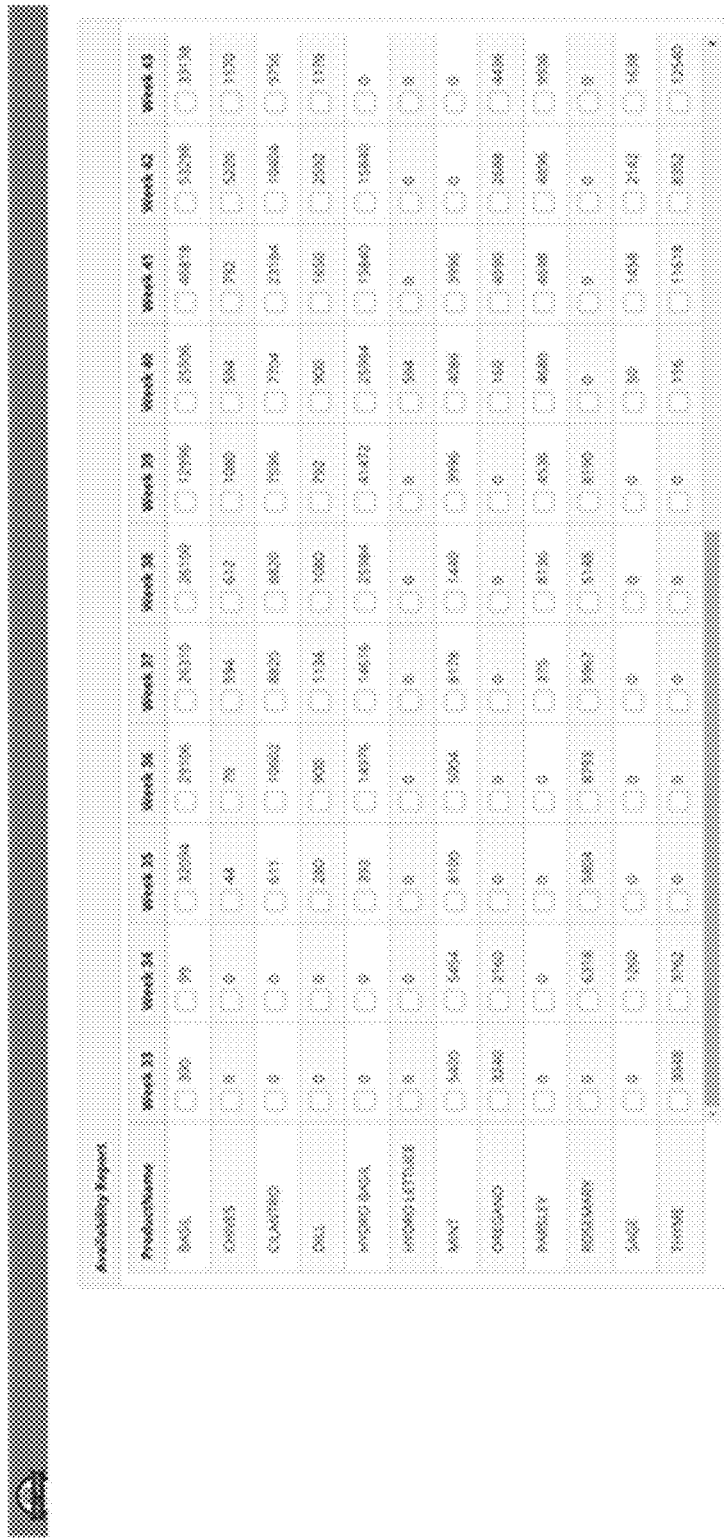

Referring now to FIG. 3D, an example availability report user interface is illustrated. The availability report user interface may be dynamically updated, optionally in real time, to track real time product availability. In order to provide such real time product availability of greenhouse crops, data input via the sow user interface, the dump user interface, and the pick user interface may be utilized (where pick and dump data may be deducted from the crop availability). The availability report may be utilized by growers operating the greenhouse to identify which crops for a given time period (e.g., the current week) are available for shipping. When a week's crop is available, the grower may the corresponding week for the crop (e.g., by checking a corresponding checkbox), and the corresponding crop inventory will be used in a rolling orders report. Optionally, each week (or other time period) the checkboxes will be defaulted to unchecked, and the new current availability will be marked. The availability data may also be used by the greenhouse pick staff and/or automated picking equipment to identify the SOW week crop that needs to be picked and packed for the daily herb call sheets.

The crop management system may calculate the demand for a given week for a given product, and may automatically trigger an availability alert communication when the calculated demand for the crop/week is greater than the actual availability. The availability alert communication may be transmitted via a messaging service (e.g., an SMS/MMS messaging service, an email, a dedicated application hosted on a user device, via a SaaS webpage, etc.) to one or more destinations (e.g., the grower, an administrator participating in the crop management, etc.) that notifies the recipients that there is a potential shortfall of a specified crop in a specified future week.

A demand planning algorithm may be utilized that employs year-over-year (YoY) sales of a given crop, trending demand projections vs actual ratio (Rolling Demand Factor—RDF), and rolling sales averages (RSA), to dynamically calculate the projected demand for each crop/product.

$$\text{Projected Demand} = \text{YoY} * (\text{Factor1}) * \text{RDF} + 0.25 * \text{RSA}$$

Where Factor1 relates to the projected change in YoY sales total across the aboard (e.g., Factor1 may be set to 1.1 which represents a 10% projected YoY increase in sales total across the board).

The projected demand may then be used to dynamically populate a production/demand planning schedule for a given time period (e.g., a weekly production schedule comprising data and/or instructions) for the greenhouse. Optionally, such equipment may be used to control automated greenhouse equipment (e.g., the automated greenhouse equipment, such as automated watering equipment, automated pesticide spray equipment, automated crop picking equipment, climate control equipment, crop spacing equipment, packaging equipment, and/or pallet loading equipment).

Figure 3E:
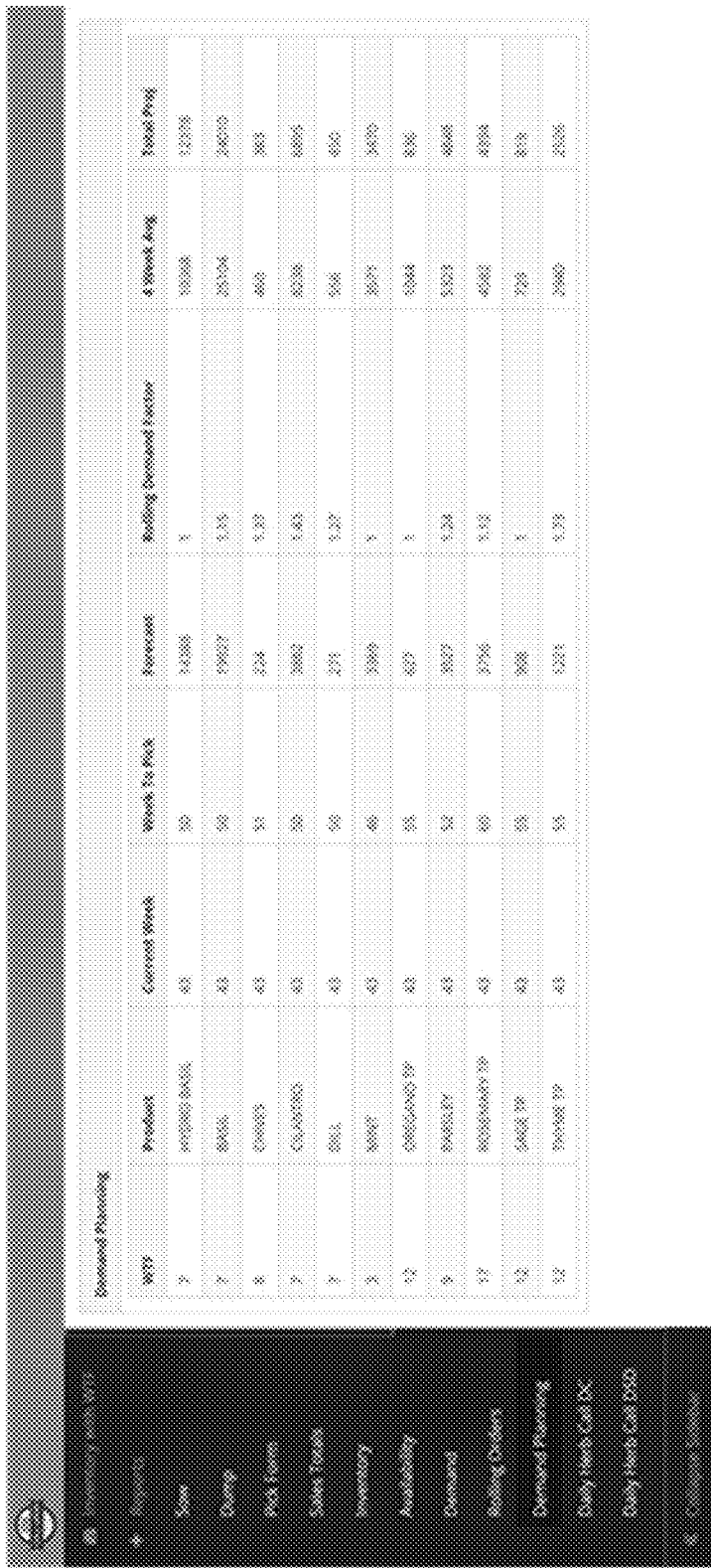

Referring now to FIG. 3E, an example production/demand planning report user interface is illustrated. The user interface may include a table including, for each crop, the following columns: WTF (weeks-to-finish, corresponding to how many weeks until the crop is ready to be picked) or DTF (days-to-finish corresponding to how many days until the crop is ready to be picked), crop/product, current week, weeks to pick, demand forecast, rolling demand factor, 4 week average demand, and total projected amount.

Figure 3F:
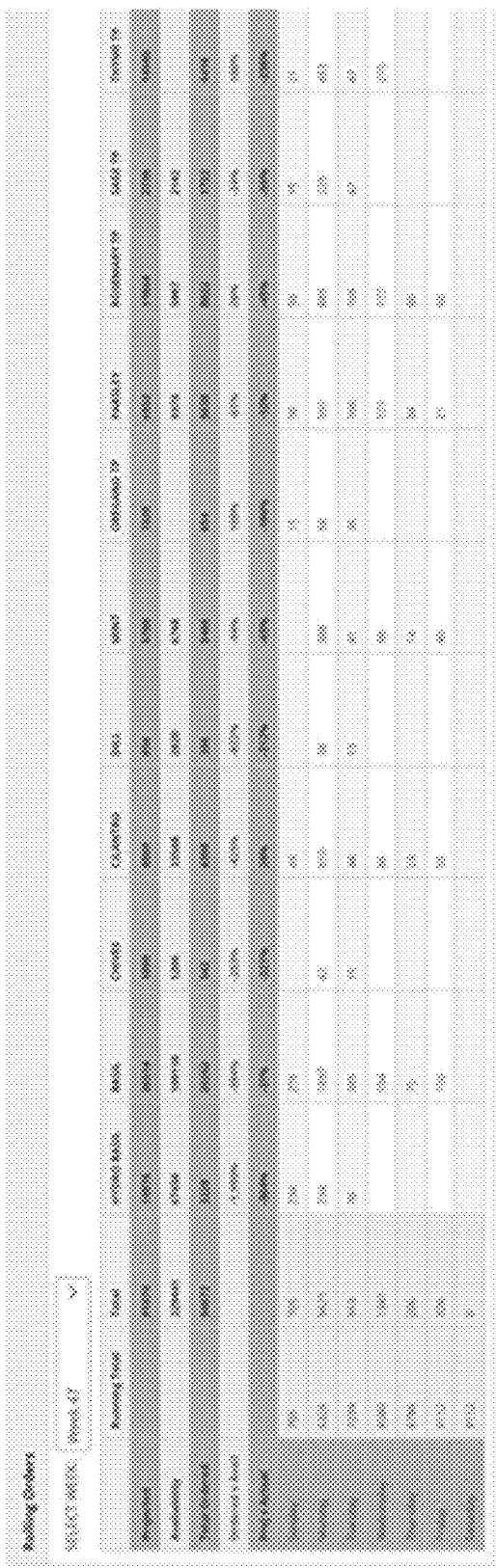

Referring now to FIG. 3F, an example rolling orders report user interface is illustrated. The rolling orders report user interface comprises a dynamic report that tracks (optionally in real time) sales over specific time periods (e.g., daily). The rolling orders report may be used to track orders, projected greenhouse crop availability, and actual availability. The rolling orders report may be used to determine if the crop availability for a given period of time (e.g., a specified week) is greater or less than the actual orders.

For example, if the availability quantity of a given crop for a given week is less than the orders for that week (resulting in a short fall), a determination may be made based on projected availability for the crop for a future week (e.g., the next week) and orders for the future week whether the crop for the future week may be shipped in the current week to make up the short fall in crops for the current week relative to the orders for the week.

By way of further example, if the availability quantity of a given crop for a given week is greater than the orders for that week (resulting in an oversupply), a determination may be made based on projected availability for the crop for a future week (e.g., the next week) and on orders for the future week whether the crop oversupply for the current week may be used to fulfill orders for the future week. This may be particularly advantages when the projected availability for the crop for the future week is less than the actual or projected orders for the future week.

The rolling orders report user interface may utilize sales data imported from sales tracking software, which may be a component of an enterprise resource planning software suite, and from the pick report discussed elsewhere herein. The crop management system (and the rolling orders report user interface) may continuously track crop/product sales data against crop availability to assure smooth distribution of available crops. A menu may be provided via which a user can select a desired time period (e.g., a desired week) for which data is to be presented.

Table columns may include running total (the total ordered for the week), total (the total ordered for the day), and an order amount column for each crop/product. Rows may include projected, available, total, order percentage, projected percentage, and days (days of the week). The projected value corresponds to the projected quantity of a given crop that will be available for the selected week. The availability value corresponds to the actual quantity of a given crop that will is available for the selected week. The order percentage is the order quantity as a percentage of the crop availability. The projected percentage is the projected crop quantity as a percentage of the actual crop availability. Thus, for each, for each day, the columns may provide the running total, total, and an order amount for each crop for that day. The rolling order user interface may be populated using data from a pick report that includes the identification of and the quantity of actually picked/harvested data for the corresponding time period.

A rolling order alert may be automatically triggered when the system detects that orders for a certain time period (e.g., weekly orders) are trending (on track) to exceed available inventory. The determination as to whether weekly orders are trending (on track) to exceed available inventory alert may be based on the historical percentage of weekly order by day, and the rolling alert may be triggered when the weekly orders to date exceed the expected orders to date. The rolling order communication may be transmitted via a messaging service (e.g., an SMS/MMS messaging service, an email, a dedicated application hosted on a user device, via a SaaS webpage, etc.) to one or more destinations (e.g., the grower, an administrator participating in the crop management, etc.) that notifies the recipients that there may be insufficient crops to fill the actual orders to enable alternative sources of crop to be identified.

For example, when such a rolling order alert is triggered, a determination may be made as to whether there are greenhouse crops scheduled to be harvested in a future week that may be harvested earlier to make up the shortfall. Such a determination may be made based on the state of the crops scheduled to be harvested in a future week. For example, a camera-equipped drone may be used to periodically (e.g., hourly, daily, weekly, etc.) fly through the greenhouse and capture images of the crops. The greenhouse may have been mapped, with an indication as to where the rows of plant trays or other growing medium are placed, and what plants are in what trays. As described elsewhere herein, an object recognition and analysis system may be utilized to analyze the images and determine the height, width, colors, and/or health of a given crop, and utilize such analysis to determine whether a crop scheduled to be harvested in a future week is ready to be harvested in the current week. For example, the greenhouse map be used to associate the output of the object recognition and analysis system with respect greenhouse crops (e.g., herbs).

Figure 3G:
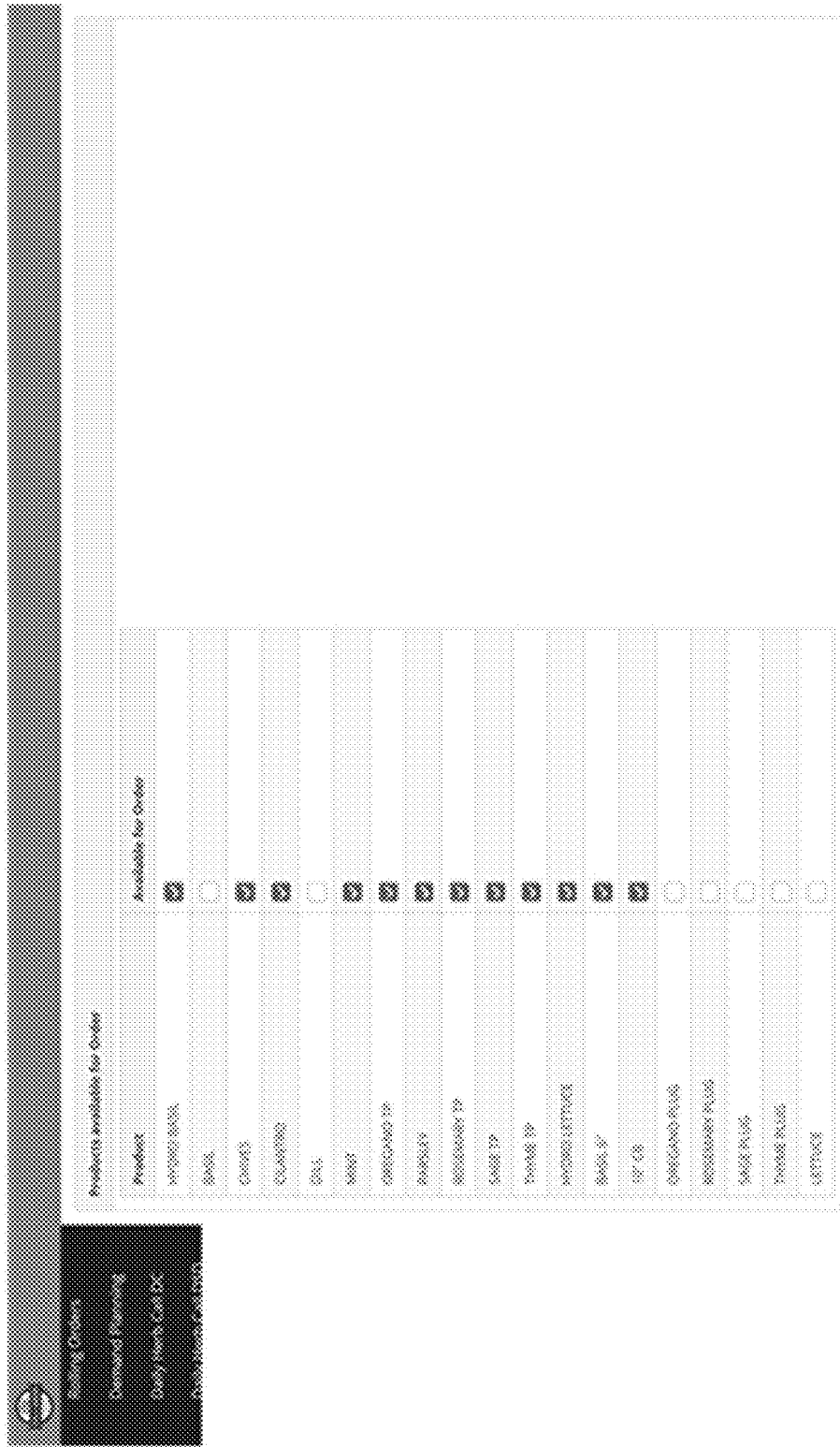

Referring now to FIG. 3G, an example product availability user interface is illustrated. The product availability user interface enables the user to control which products will be available for order by direct to store delivery (DSD) customers on a given day. If a determination is made that the greenhouse will be short of a certain crop/product for a certain time period of interest (e.g., a day or week), the user may deselect that crop/product (e.g., by unselecting a corresponding "available for order" checkbox). This will immediately, in real time, cause the corresponding the crop/product to be designated as unavailable in a DSD Online Ordering user interface provided to customers for placing crop/product orders. Optionally, the system will reset the defaults each day (or other time period), and so a user may need to select the previously deselected crop/product each day to assure that the crop/product is not inadvertently assigned the status of unavailable even when the crop/product is available.

Figure 3H:
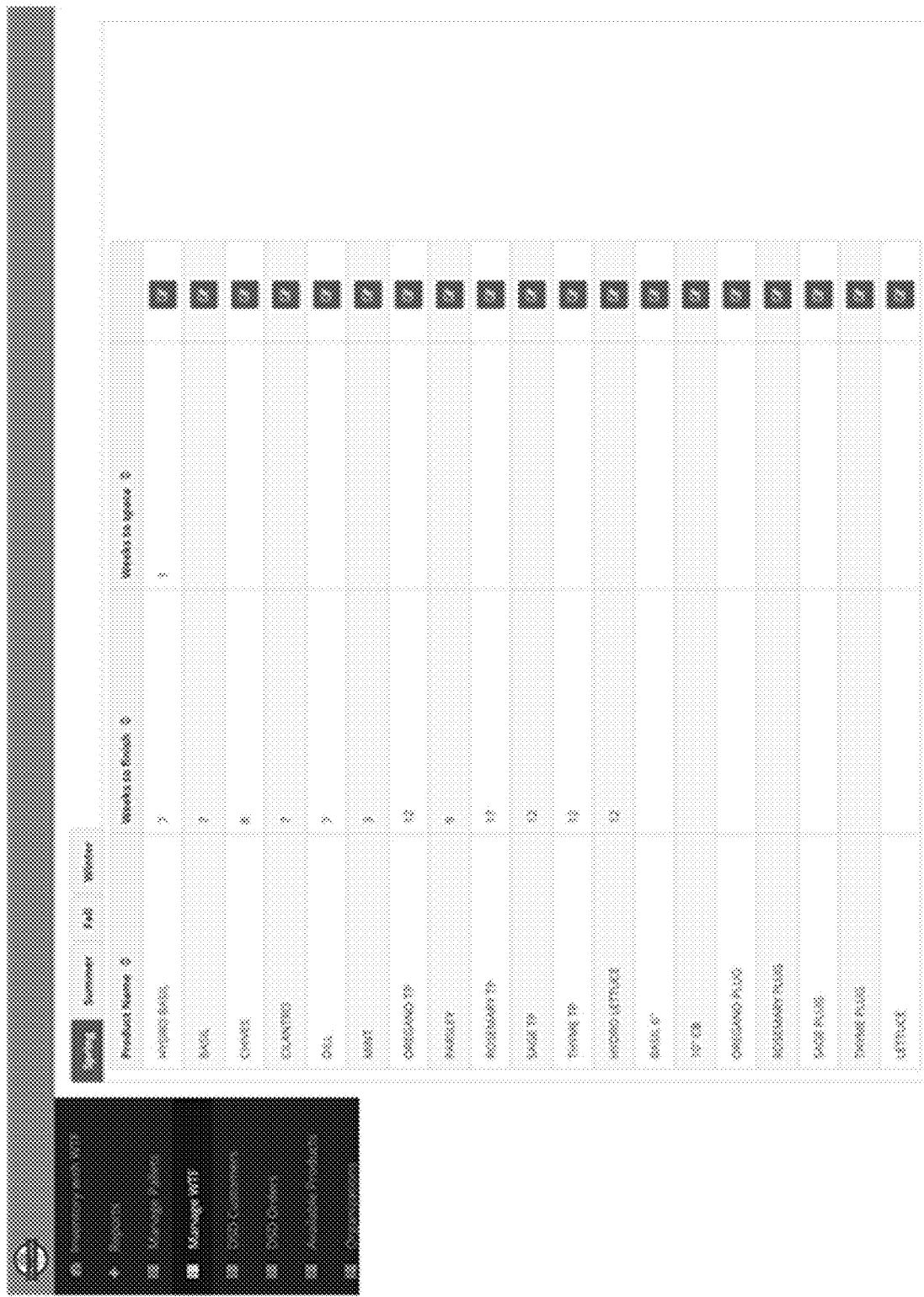
Figure 31:
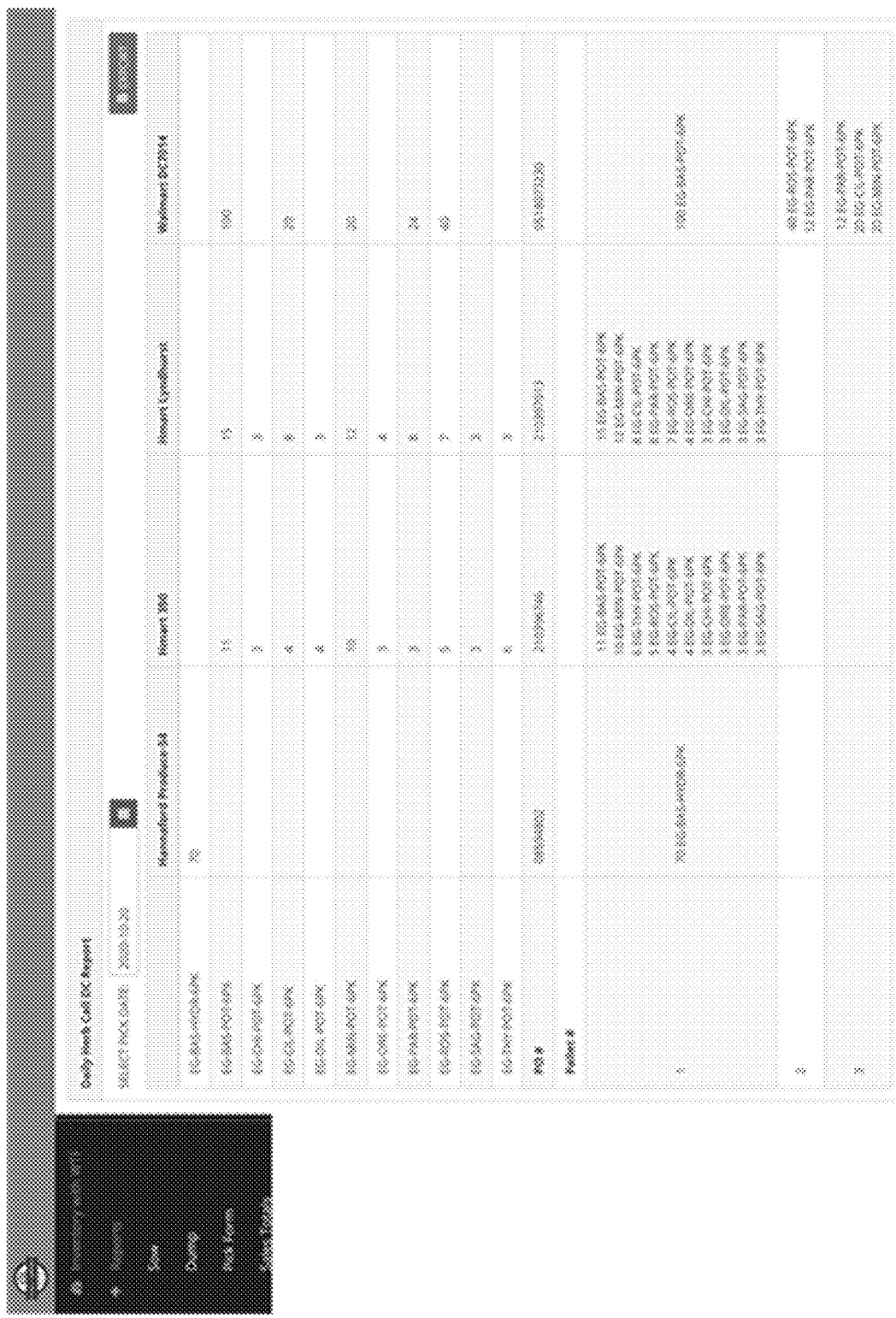

Referring now to FIG. 3H, an example time to finish (time until a crop is ready to pick or transport) user interface is illustrated. The time to finish can be expressed as weeks to finish or days to finish. The time to finish user interface is configured to enable a user to manage the time to finish for given crops/products and seasons. The seasons may be predefined or may specified using user-specified custom start and end dates. The time to finish a user interface may be used to connect or relate a SOW week (or day) to a corresponding available week (or day). For example:

Available week=SOW Week+Weeks to finish

The time to finish may also be used in performing crop/product demand planning. The year-over-year crop demand may be imported from the demand week calculation below:

Demand Week=SOW Week+weeks to finish

As noted above, rather than using weeks to finish, days to finish may be utilized to provide finer control of the greenhouse crops.

Referring to FIG. 3H, the time to finish user interface may include tabs for each season (spring, summer, fall, winter). Each tab may include a corresponding table, including the following columns: crop/product, time to finish (e.g., weeks to finish), time to space (e.g., weeks to space). The time to space corresponds to the time period (e.g., expressed as weeks or days) after which crops (e.g., positioned in trays or pots on tables) will need to be moved to accommodate future crop growth. For example, during initial sowing a crop (e.g., an herb crop) may be spaced so that there are about 1400-1800 plants on a greenhouse table. At the end of the time to space (e.g., after 2 or 3 week) the plants may need to be moved further apart to provide additional space to grow (e.g., where there may be only 200-400 plants on a greenhouse table). Optionally, the spacing instructions may be executed by automated greenhouse spacing equipment.

Sort controls may be provided to enable the table to be sorted in ascending or descending order in accordance to a selected column. Each table row corresponds to a given crop/product. Edit controls may optionally be provided that enable entries to be edited and that enable an entire row of entries to be deleted.

Referring now to FIG. 3I, an example daily herb call sheet DC (distribution center) report user interface is illustrated. It is understood that although the user interface is referred to as a daily herb call sheet DC, it may be similarly adapted for use with other crop-types and for other time periods (e.g., weekly). A distribution center may be owned or controlled by an entity that owns or controls many supermarkets or the like that will receive the herbs (or other crops) for sale to customers. Thus, large, bulk shipments may be made to a distribution center, which will in turn ship appropriate portions of the shipment to associated supermarkets. The daily herb call sheet DC user interface may use a daily import of files of crop sales data from an enterprise resource planning system.

The daily herb call DC report parses the crop sales data for each DC customers for each day, and identifies the corresponding purchase order (PO) and crop (e.g., herb) totals. In addition, the daily herb call sheet DC user interface generates a pallet map and pallet placards. For example, the illustrated table may include a pallet section, listing pallet numbers and the number of each crop/products (e.g., number of the actual crop, the number of cases, etc.) to be included in the corresponding pallet.

The pallet map specifies the specific crop/product makeup (e.g., based on crop/product cases) for each pallet for each purchase order.

The placard tool generates a printable pallet placard (e.g., a PDF document) that has the DC customer information, logo, delivery date and pallet contents (e.g., the crop type and packaging information). Optionally, the information printed on the placard may be in human readable text and/or in a machine readable optical indicia, such as one dimension or two dimensional (e.g., QR code) bar code. Having the placard information printed in a machine readable optical indicia enables the placard to be scanned at the greenhouse shipping area, while on the transport vehicle, and at the destination using an optical scanner, thereby facilitating inventory control and tracking. The placard may be placed in or on the pallet. Optionally, the placard may have an adhesive backing to enable it to be affixed to the pallet. Optionally, the placard may be inserted into a placard holder mounted to the pallet.

Figure 3J:
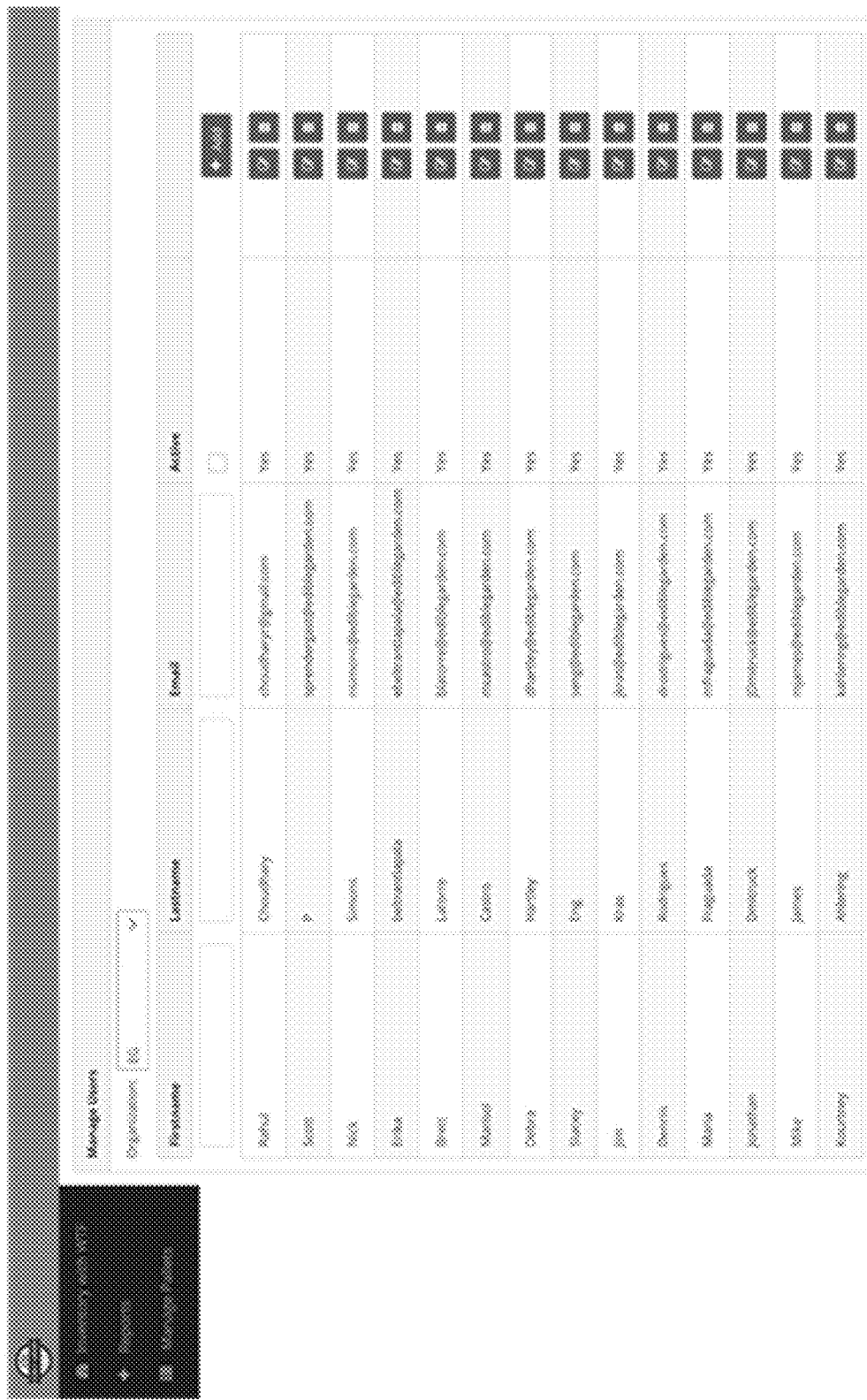
Figure 3K:
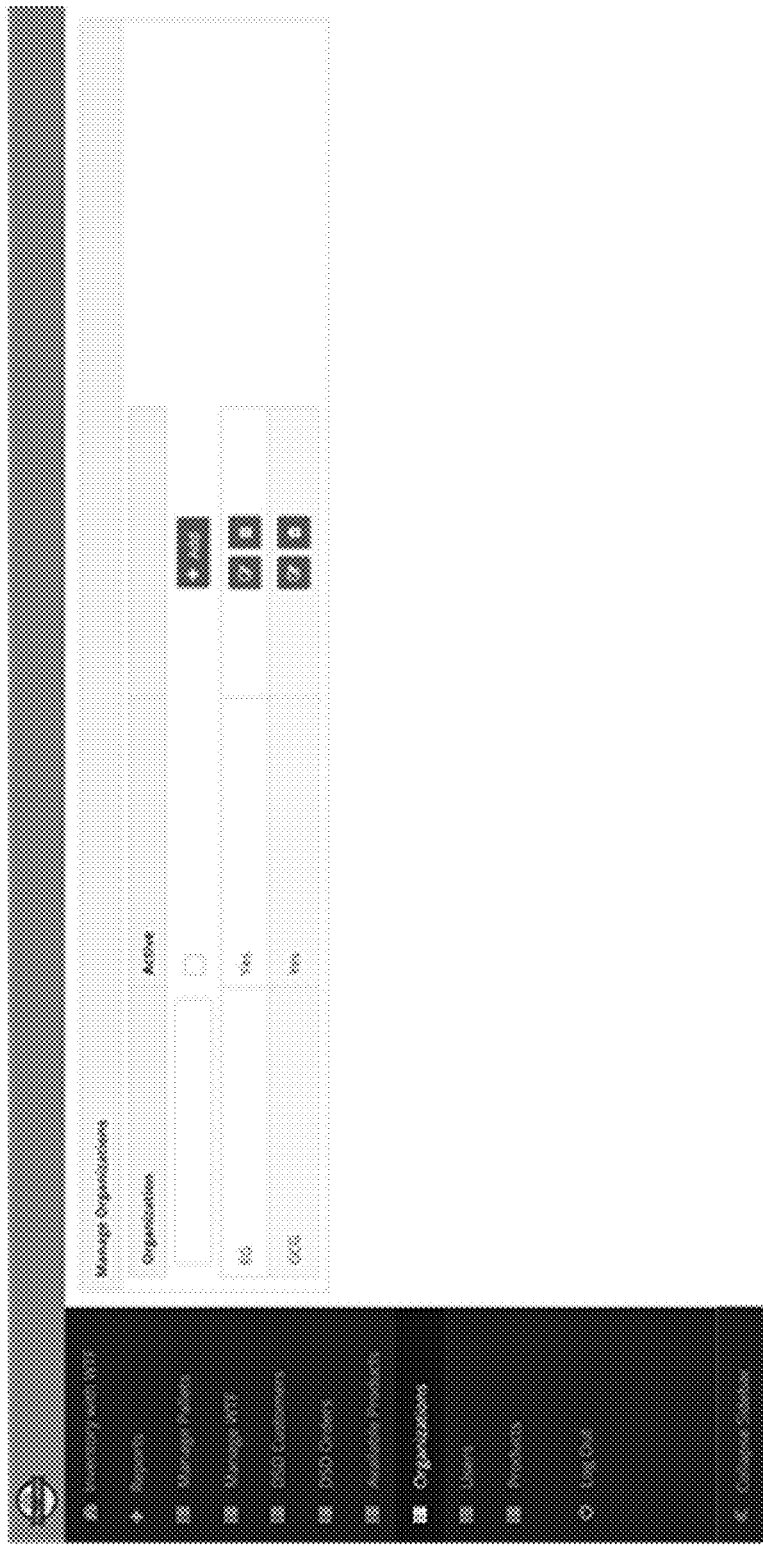
Figure 3L:
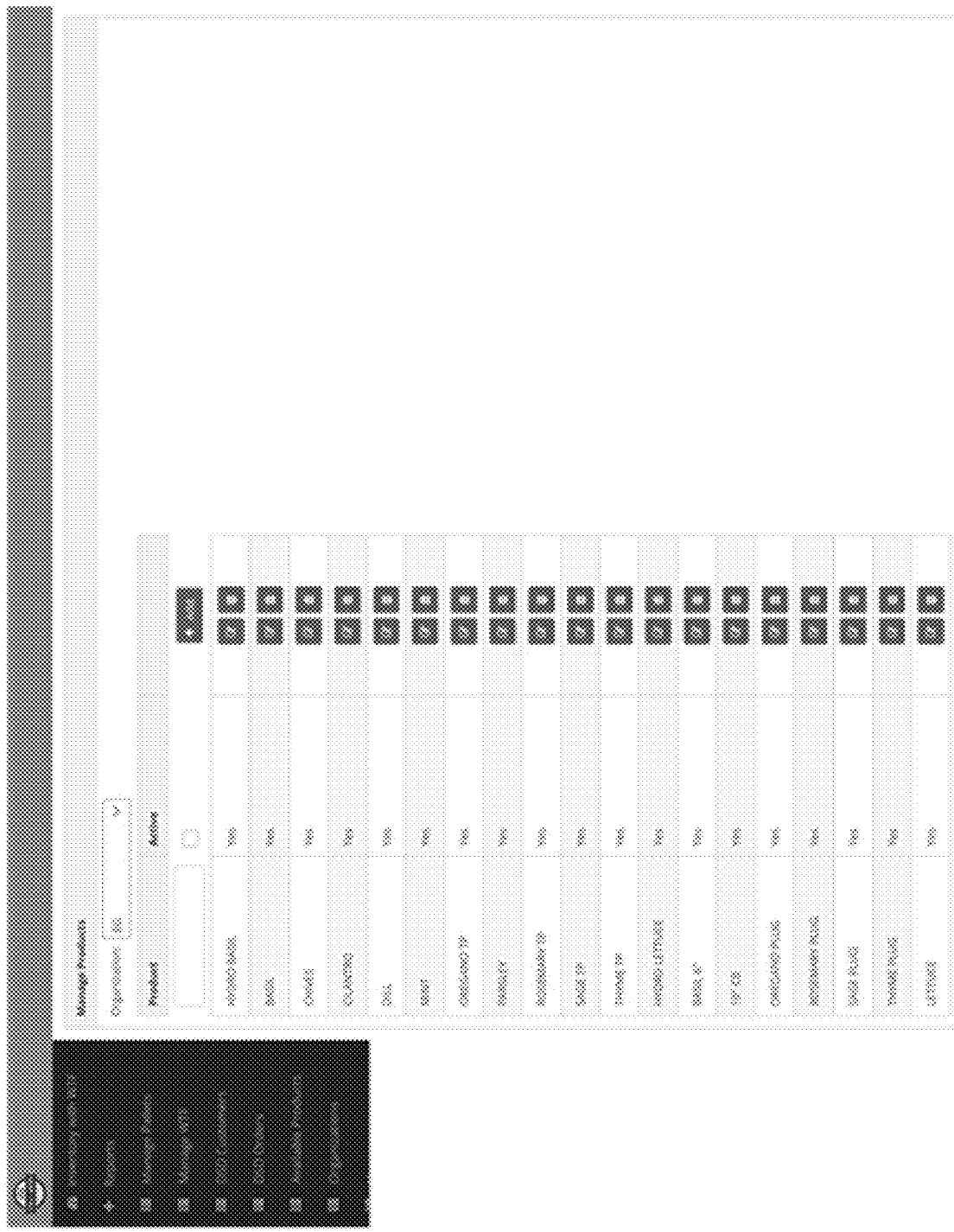
Figure 3M:
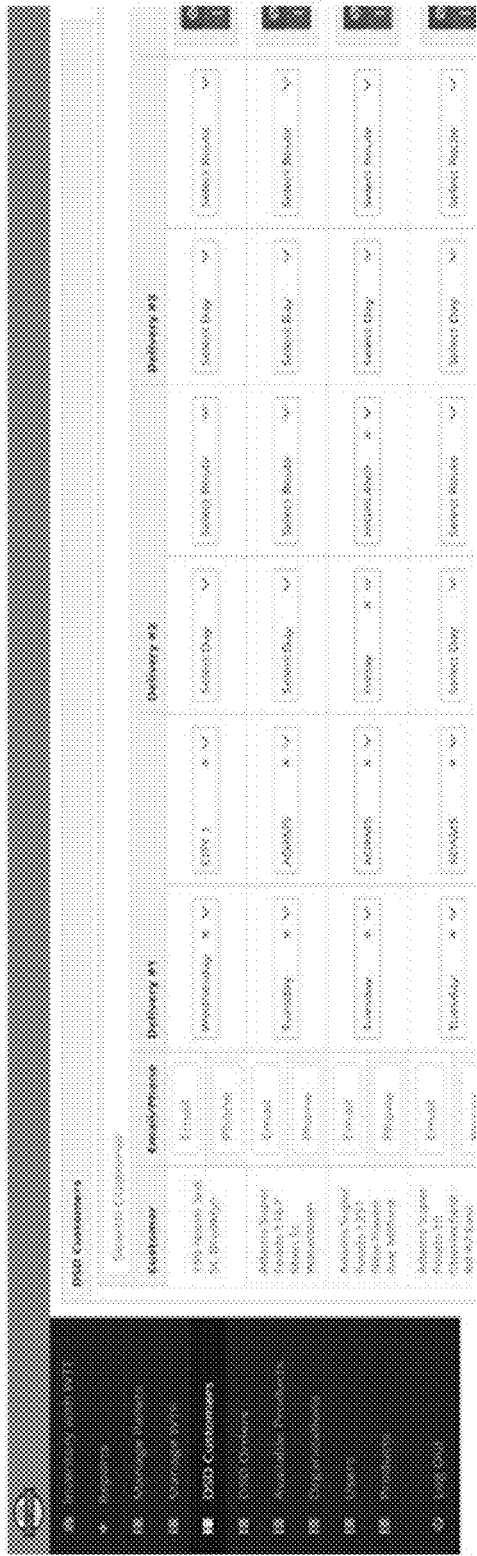
Figure 3N:
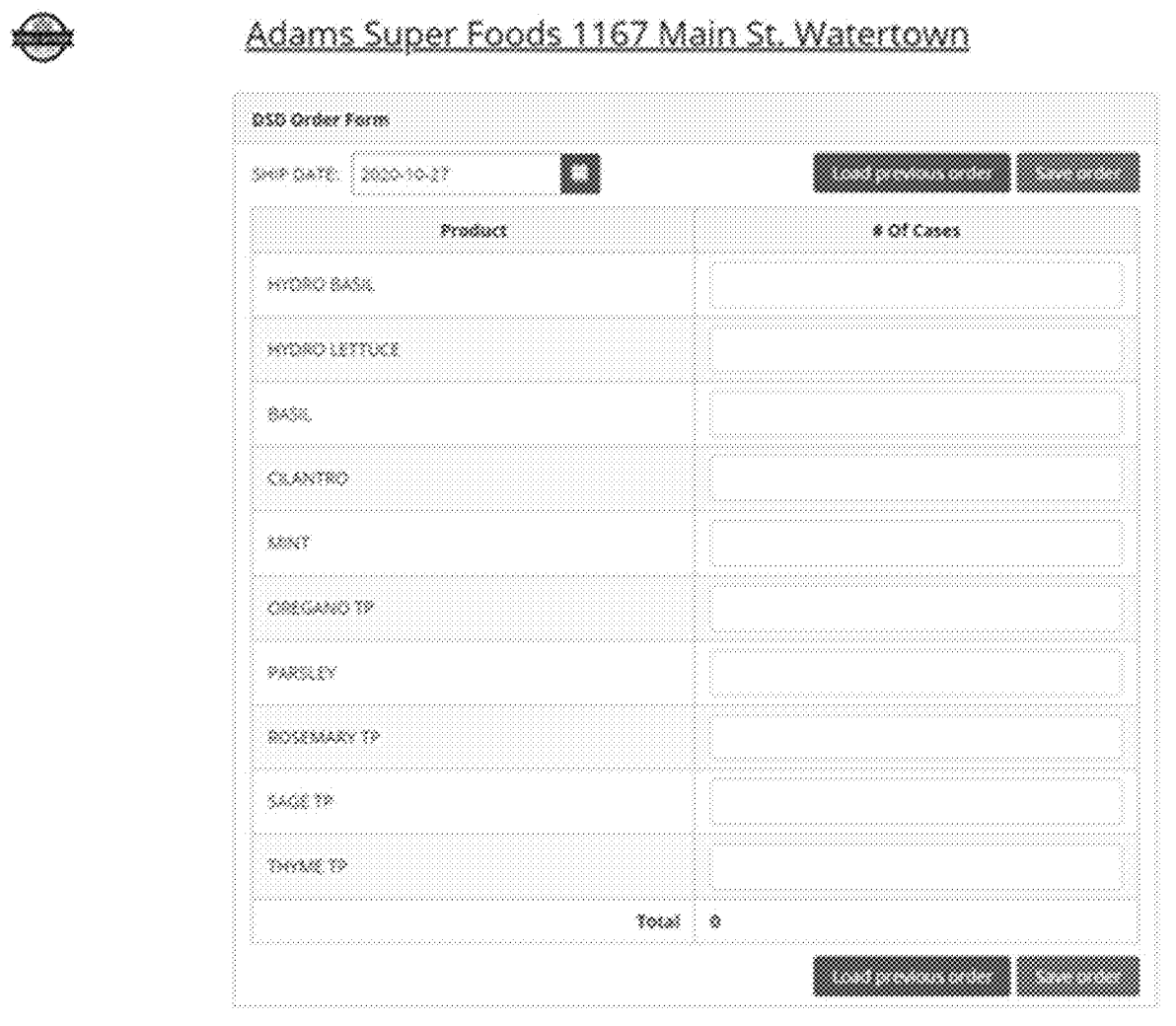
Figure 3O:
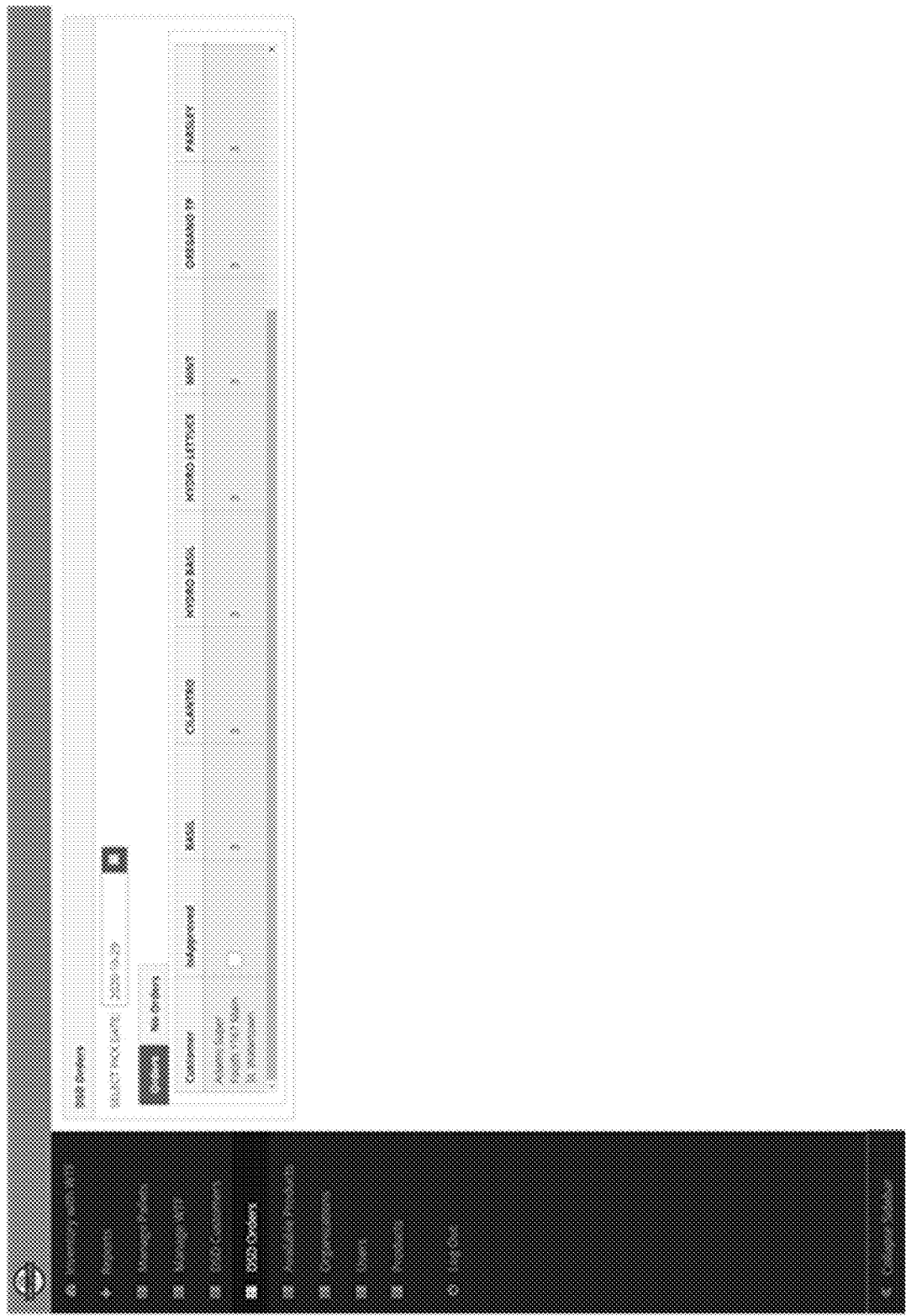
Figure 3P:
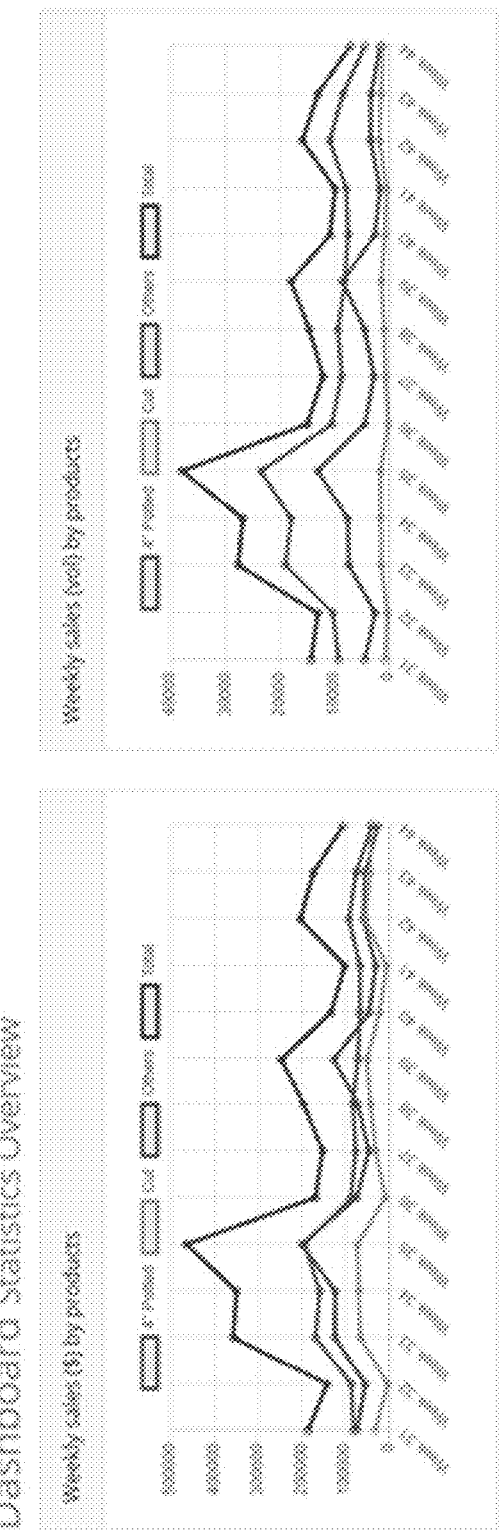
Figure 3Q:

An example placard is illustrated in FIG. 3Q. In the illustrated example, the placard includes the pallet number in the current shipment to the customer (e.g., pallet 3 of 3 pallets), the customer name and/or address accessed from the customer account record, a logo accessed from the customer account record, the shipment scheduled delivery date, the purchase order number, the total number of pallets in the shipment, and the number and types of crop packs.

The daily herb call sheet DC report user interface may include a table, with a separate column for each purchase order, and may identify for each product the quantity included in the purchase order and the customer that placed the order. A menu is provided via which the user may select a pick date for the report. An export control may be provided, which when activated, cause the report to be exported in a specified format (e.g., a spreadsheet).

For example, a pallet layout may take the quantity totals for each of the crops (e.g., herbs) to be placed on pallets, and selects, from largest quantity to smallest quantity, the number of each crop to be placed on a pallet so as to correspond to a maximum number. For example, if the maximum number of crops that are to be placed on a pallet is 100, and if the shipment includes 170 Basil cases, 100 Cilantro cases, and 60 Parsley cases the pallet tool may build pallet layout as follows:

Pallet 1 100 Basil cases
Pallet 2 70 Basil cases, 30 Cilantro cases
Pallet 3 70 Cilantro cases, 30 Parsley cases
Pallet 4 30 Parsley cases Optionally, where there are multiple pallets, the pallet builder may be configured to attempt to layout the pallets so that each or a subset of pallets contains the same or similar number of crops. Thus, if two or more pallets contain different numbers of crop cases according to an initial layout generated by the pallet builder, and one of the pallets is assigned less than a threshold number of my cases, the pallet builder may generate a new layout that better equalizes the number of cases on two or more pallets. Thus, if one pallet is full and another pallet has less than the threshold number of cases, certain cases may be reallocated from the full pallet to the less-than-full pallet to thereby better avoid the shifting of cases during transportation (and the resulting potential damage to the crops).

In the foregoing example, the threshold number of cases may be 40. Because pallet 4 has less than 30 cases and pallet 3 is full with 100 cases, the pallet builder may generate new layouts for pallets 3 and 4 so that each has the same number of cases as follows:

Pallet 3 65 Cilantro cases
Pallet 4 5 Cilantro cases, 60 Parsley cases

Certain modules and user interfaces will now be described that enable the control and access to user and organizational data. For example, optionally all users in a given organization may be granted the same level of access and control of such data. Optionally instead, different users or classes of users (e.g., upper level managers, mid-level managers, low level managers, non-managers) may be granted different levels of level of access and control of such data. For example, upper level managers may be given access and control to all user data, while non-managers may be provided with limited or no control or access to such user and organizational data.

Referring now to FIG. 3J, an user definition user interface is illustrated. A drop down menu is provided via which a user may select an organization of an entity (e.g., the greenhouse owner/manager, the name of third party partner farm systems, the name of the system operator, etc.). A user table will be populated with the first name, last name, contact information (e.g., email address, phone number, etc.) of members of the selected organization, and an indication as to whether the users are active or inactive users (e.g., still employed at the organization or no longer employed at the organization). Edit controls may optionally be provided that enable entries to be edited and that enable an entire row of entries to be deleted (e.g., to delete a user from the organization).

A control may be provided which enables additional users to be added to the organization. Optionally, the table may identify a function/title for a given user and/or user data and control access and use rights. Optionally, search fields may be provided for each column configured to receive search text. A search engine may be provided that searches for matching entries in the corresponding column and provides corresponding matching search results.

An Organizations module may be provided that is configured to provide access controls for third party partner farms (which may optionally include greenhouse). Each such third party farm may be provided with its own unique administration access. The system may require the third party partner farm administrator to supply access authentication data (e.g., user identifier and password and/or biometric data, such as a fingerprint, face print, iris patter, etc.) in order to access the third party partner farm's user data and/or certain other data disclosed herein. The authorized administrator by then be provided with a user interface (e.g., the user interface described above with respect to FIG. 3J).

Additionally, a given third party partner farm administrator may be provided with the ability to add in products not associated with the system operator to the third party partner farm portal. Thus, third party partner farm may be provided the ability to manage internal products in addition to those being provided to the crop management system operator. Where the third party partner farm is providing a given product/crop to both the system operator and its own customers, the system may enable the third party partner farm system administrator to duplicate an entry created for a crop/product for the system operator to be used in a corresponding table of crops/products being supplied to the third party partner farm's other customers.

Referring now to FIG. 3K, an organization management user interface is illustrated. A table includes a column listing the name of each organization (e.g., the name of third party partner farm systems, the name of the system operator, etc.), and a column indicating whether the organization is active or inactive. Edit controls may optionally be provided that enable entries to be edited and that enable an entire row of entries to be deleted (e.g., to delete an organization). A control may be provided which enables additional organizations to be added to the table and corresponding records. Search fields may be provided for each column configured to receive search text. A search engine may be provided that searches for matching entries in the corresponding column and provides corresponding matching search results.

A Products module may be provided that enables an authorized user to assign one or more product data feeds from an enterprise resource planning to corresponding organizations. For example, a third party partner farm system administrator may perform the feed assignment for crops/products being provided to its own customers (as opposed to the system operator who may distribute the crops/products to its customers). Optionally, by default, all crops/products are owned or being provided to the system operator.

Optionally, the crops/products listed in the manage products user interface illustrated in FIG. 3L may be included in some or all of the system generated reports. A menu may be provided enabling a user to select a desired organization (e.g., the name of third party partner farm systems, the name of the system operator, etc.), and the corresponding crops/products are accessed from a database and displayed in corresponding rows in a products column in a table. A column is provided including entries indicating whether the product is active or inactive. Edit controls may optionally be provided that enable entries to be edited and that enable an entire row of entries to be deleted (e.g., to delete a product). A control may be provided which enables additional products to be added to the table and corresponding records. Search fields may be provided for each column configured to receive search text. A search engine may be provided that searches for matching entries in the corresponding column and provides corresponding matching search results.

FIG. 3M illustrates an example direct to store delivery (DSD) customer user interface comprising a table. The table may include row for each customer, and a customer column (including the customer name and/or address), a customer contact column (e.g., including the customer's email and/or phone number), and one or more sets of delivery columns (where a given set may include a delivery day or date column and a city or address column). The DSD Customer user interface may be populated using data accessed from an enterprise resource planning software suite, manually entered data, or with data corresponding to automated recurring orders. A given DSD customer name in the customer column may be configured as a link to a customer-specific purchase order form (e.g., where when a user clicks on a customer name, the corresponding customer-specific ordering form is accessed from memory and presented for display). Edit controls may optionally be provided that enable entries to be edited and that enable an entire row of entries to be deleted (e.g., to delete a customer entry). Search fields may be provided for each column configured to receive search text. A search engine may be provided that searches for matching entries in the corresponding column and provides corresponding matching search results.

Optionally, the crops/products available to a given DSD customer may be controlled via a menu (e.g., presented via a pop-up user interface) listing user-selectable (and de-selectable) crops/products. If a given crop/product item is selected via the menu, it may be made available to the DSD customer for order via a corresponding product list. If a given crop/product is deselected, the crop/product will not be listed in the product list provided to the DSD customer, and so may not be ordered by the DSD customer.

Optionally, the DSD customers daily route information is accessed from memory and displayed via the user interface. Optionally, such route information may be edited by the user. The daily route information may be used to generate the daily herb call sheet DSD, and enables users to make route adjustments in real time, while maintaining the set default information.

Referring now to FIG. 3N, an example DSD Ordering user interface in displayed. Optionally, the DSD Ordering user interface is customized for each DSD customer (who may be identified via authentication data provided by the DSD customer). For example, the listed crops/products may be limited to those that the DSD customer is authorized to order (e.g., via the direct to DSD customer user interface illustrated in FIG. 3M). The DSD customer may specify, via the DSD Ordering user interface, the number of cases (or other packaging system) of each of the listed crops/products. The submitted order information may be stored in a database and synced to the enterprise resource planning software suit, and may be pushed to (and used to populate) the daily Herb Call Sheet DSD. Optionally, to expedite ordering, a control (e.g., a load previous order control) may be provided via which the DSD customer may have their previous order of crops/products order auto-loaded into the DSD Ordering user interface.

Optionally an administrator user interface may be provided via which a user (e.g., an authorized administrator) may specify minimum order quantities (on a crop/product-crop/product basis and/or for the overall order). In response to the minimum order quantities specification, the DSD Order form may be configured to prevent submission of an order if the quantity total is not greater than or equal to the minimum order quantities specification.

Optionally an administrator user interface may be provided via which a user (e.g., an authorized administrator) may input or select marketing messages and/or crop/product information that will be displayed via specified or all DSD Ordering user interfaces.

Optionally, the system may automatically generate and transmit messages (e.g., SMS/MMS messages, email messages, voice call messages, messages configured to be presented via a webpage or dedicated application, etc.) reminding direct customers or distributors of order dates and providing links to orders or the DSD Ordering user interface. For example, the system may track when or how often a DSD customer typically places an order for crops/products, predict a date when the DSD customer likely intends to place another order, and may automatically generate a reminder message a specified number of days, hours (or other time period) prior to the predicted date, reminding the DSD customer regarding the option to place an order for such date. Optionally, the message may include a link to a default order, automatically populated with order information (e.g., the quantity of each crop/product) from the previously placed order, where the DSD customer can activate an order control (e.g., a one click order approval control) to place the order using the automatically populated order information.

Referring now to FIG. 3O, an example DSD Order Approval Queue user interface. The DSD Order Approval Queue user interface is optionally populated, using data from a database, with DSD customers' orders for a date selected via a date field. For example, a given row may include a column listing a DSD customer name and address, and crop/product columns listing the number of cases (or other packaging) being ordered by the DSD customer. The approval queue enables an administrator to review and approve DSD customer orders prior to submission to the enterprise resource planning software suite and Daily Herb Call Sheet DSD.

Referring now to FIG. 3P, an example reporting user interface is illustrated. In this example, the reporting user interface includes generated weekly (or daily, monthly, or other time period) sales trend graphs by sales totals, dollar values and by quantity/volume, such as herb or product type (e.g., cut, potted, other) specific sales (e.g., view aggregate sales of all herbs or product types, aggregate sales of specified group(s) of herbs or product types, and/or the sales of individual herb types or product types).

Similar graphs and reports may be generated for customer-specific sales of crops/products, shipping costs, crop/product shipment rejections, dumps, and sow totals.

An example plant height/weight user interface will now be described. The plant height/weight user interface is configured to be populated (e.g., directly from a database via user input) with the average (or other statistical central tendencies) plant height and average plant weight for the inventory in a given greenhouse (e.g., for all weeks). The plant height/weight data may be used by an environmental effect algorithm. The plant height/weight user interface may be populated for each sow week and crop/product type combination that is planted in the greenhouse. The plant height/weight user interface may be populated in real time using data from the availability report and analysis data generated from the output one or more sensors (e.g., an unmanned vehicle camera system, which may include multi-spectral cameras). The weight data may be used to measure/determine moisture levels in the growth media.

Optionally, the plant height/weight data may be populated with plant health data obtained via one or more sensors. For example, a sensor-equipped unmanned vehicle path within a greenhouse may be generated using a mapping system. The unmanned vehicle (which may an aerial or non-aerial vehicle) may follow the mapped out path and capture high resolution photographs of the greenhouse crops.

The vehicle camera system may include a visible light camera, a near-infrared light camera, an infrared light camera, and/or cameras configured to capture other light wavelengths to thereby capture hyperspectral images (which may comprise frames of a video captured by the unmanned vehicle). Such images and the values observed by the sensors planted in the crop soil may be utilized to determine the presence and/or to predict the possibility of plant diseases and pests.

For example, the images captured by the unmanned vehicle may be submitted to and processed by an artificial intelligence engine hosted on a local or remote system. Optionally, the artificial intelligence engine may include a machine learning engine that utilizes one or more probabilistic graphical models. Optionally, the learning engine may comprise a neural network having an input layer, an output layer, and one or more hidden layers. The hidden layers may include neurons connected by weights, the weights corresponding to the strength of the connection between neurons. During a training process, when a neural layer is trained on an input, the difference between the predicted and true output causes an update in the weights via a backpropagation process.

The artificial intelligence engine may analyze images for respective crops, and may identify the crop color(s), the crop size, the presence or presence likelihood insects, and/or the presence or presence likelihood of a crop disease. When certain states (e.g., disease states or insect infestation states) are identified or estimated to be present with at least a threshold confidence factor, a corresponding may be generated identifying the state and optionally a confidence factor. The alert may be transmitted via a messaging service (e.g., an SMS/MMS messaging service, an email, a dedicated application hosted on a user device, via a SaaS webpage, etc.) to one or more destinations (e.g., the grower, an administrator participating in the crop management, etc.).

Other user interfaces and reports may include a crop spacing report and a time period-based (weekly) crop production report. The crop spacing report may be dynamically generated and may assign the task of plant spacing within a greenhouse based upon the specified spacing days (e.g., in the WTF table for each plant, such as each herb). The time period-based (weekly) crop production report may be dynamically generated using a demand planning algorithm, such as that described elsewhere herein, defining the daily sow schedule for respective time periods (e.g., each week).

Examples of a product report (also referred to as a product summary), a pesticide schedule (also referred to as a spray schedule), and an availability report are respectively illustrated in FIGS. 3R (FIGS. 3R-1, 3R-2), 3S, and 3T. The foregoing reports may be provided in the same document (e.g., a spreadsheet with different tabs for each report, wherein a user selection of a tab causes the corresponding report to be presented). Optionally, the spray instructions may be executed by automated greenhouse spray equipment.

Referring to the product summary illustrated in FIGS. 3R-1, 3R-2, the summary report may include an identification of the time period for which the report is generated (e.g., week number, and first and/or last day of the corresponding week). The columns may include size-action instructions (where the size may be a tray size, a pot size, etc.; and where the action may include sow, pick, etc.), item (identifying the crop), the amount of the crop, the amount of transplants (where herb seedlings may be transplanted from a starting seed growth environment configured to promote germination, to a herb growth environment; or where cuttings may be transplanted), the transplant date, the location within the greenhouse (e.g., the zone), the number of tables, and notes. Each row may correspond to a production task. A separate section may optionally be provided for tasks involving transplants from cuttings and a separate section may optionally be provided for tasks involving the placement flags/ indicators (e.g., yellow flags) that are placed to identify crops (e.g., a table of crops) that are to be picked. Optionally, the instructions and tasks may be performed using automated greenhouse equipment (e.g., automated watering equipment, automated pesticide spray equipment, automated crop picking equipment, climate control equipment, crop spacing equipment, and/or the like).

The pesticide spray schedule may be dynamically generated for the greenhouse grower based upon the specific plant at issue (e.g., a particular herb type), the sow, spacing and/or pick dates. The pesticide spray schedule may be periodically updated (e.g., once a week or other period) and electronically provided to the grower, assigning and scheduling spray tasks using the foregoing criteria. It is understood that while the term "spray" may be used, other techniques of applying the pesticide may be used, such as foggers. The pesticide spray schedule as illustrated in FIG. 3S includes a table with date, day of the week, and zone columns. For each day, a corresponding entry may be provided for a given zone indicating the type and amount of pesticide to be used, how the pesticide is to be applied (e.g., using a spray device, fogger device, etc.), the number of pesticide devices to be used, and who is assigned the task of applying the pesticide for that zone on that day.

The example availability report illustrated in FIG. 3T includes a crop (e.g., herb) column, a dump amount from the previous week, a total amount (which may be based on the available inventory on the first working day of the week), the quantity per crop week (which may be based on the available inventory on the first working day of a given week), the week numbers of crops that are available, and user notes. Each row may correspond to a different crop. The availability report may be used to record the growers input of which crops are available for the target week, and transmitted to the greenhouse in the form of a hardcopy and/or an electronic report.

Optionally, some or all of the reports may be generated in batch mode rather than in real time. This enables the reports to be generated at a time of relatively low computer resource utilization (e.g., process, memory, network utilization), such as late at night or early in the morning (e.g., 10:00 PM to 4:00 AM), thereby avoiding overloading computer resources and slowing down computer processing.

An environmental impact algorithm, such as that discussed elsewhere herein) is configured to identify a quantifiable correlation between external and internal environmental condition at the greenhouse and the plant growth for each crop (e.g., herb) type. For example, the greenhouse environmental conditions may include moisture content of the growth medium (e.g., soil), $CO_2$ levels, irrigation water pH levels, greenhouse temperature, greenhouse airflow, internal and/or external humidity, sunlight intensity, and/or rain. External environmental conditions may include temperature and humidity data in areas where greenhouses are located and/or along a route via which crops are to be transported.

The environmental impact algorithm may utilize regression analysis (e.g., linear and/or non-linear regression analysis) and/or non-linear curve fitting.

For example, regression analysis may be utilized to identify, quantify, and connect the long term impact of historical and/or current weather conditions at greenhouse has on plant weight, plant height, and/or plant yields. As the weather changes and environmental conditions change at the greenhouse the environmental impact algorithm may be used to attempt to calculate the effect of such weather changes and environment conditions on the time (e.g., weeks or days) to finish each crop type, optionally in real time, providing visibility into potential future availability issues for the crops (e.g., where the weather changes and environment conditions will cause an insufficient amount of crops to be available at given time period to satisfy the demand at such time period).

As noted above, in certain instances there may be an oversupply of a crop (e.g., where the crop availability for a given time period exceeds the demand for the crop). Conventionally, such oversupply would be sold at a lost or destroyed. In order to prevent such waste of crops, optionally an online marketplace may be provided via which such crops in oversupply may be auctioned off. The online auction marketplace may receive and provide data to the crop management system and may enable producers to identify surplus inventory they want to make available for sale in the online auction marketplace. For example, the producers may identify the crop type, the quantity available, the date of availability, the location of the crop, shipping charge (if any) and where the producer is willing to ship the crops too. The crop may then be posted on the auction platform, and buyers may bid against other buyers to purchase the crops (e.g., where the highest bidder wins the auction). The producer may then ship the crop to the winning bidder. Optionally, buyers need to be verified prior being permitted to bid for posted crops.

Thus, systems and methods are described that are configured to manage greenhouse crop harvest and transport timing and yields, that provide real time data updates, and that utilize predictions and demand data to perform crop allocations.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A networked greenhouse control system configured to enhance greenhouse sowing and picking performance, the networked greenhouse control system comprising:
a network interface configured to communicated over a network with a plurality of greenhouse computer system;
at least one processing device operable to:
communicate, using the network interface, with a plurality of greenhouse computer systems;
receive, from a remote system, orders for greenhouse crops;
utilize a demand planning engine to predict demand for greenhouse crops based at least in part on the orders for greenhouse crops from the remote system;
based at least in part on the predicted demand for greenhouse crops from the demand planning engine, generate crop production instructions regarding one or more greenhouse crops for at least a first greenhouse associated with a first computer system in the plurality of greenhouse computer systems, wherein the generated crop production instructions include at least crop sowing instructions and/or crop picking instructions configured to cause crops to be respectively sown or picked in one or more greenhouses;
transmit, using the network interface, the crop production instructions to the first of the plurality of greenhouse computer systems;
generate, based at least in part on the orders for greenhouse crops from the remote system, loading instructions comprising instructions to load specified quantities of crop packs for shipment to a destination;
access greenhouse inventory data;
utilize the greenhouse inventory data to populate crop pick instructions and a dump user interface; and
transmit, using the network interface, the crop pick instructions to the first of the plurality of greenhouse computer systems to thereby effect a corresponding harvest of crops.

2. The networked greenhouse control system as defined in claim 1, wherein the networked greenhouse control system is configured to:
determine, for a first time period, whether available crops from one or more greenhouses are less than demand for crops from the one or more greenhouses;
at least partly in response to determining for the first time period that available crops from the one or more greenhouses are less than demand for crops from the one or more greenhouses, determine if crops from the one or more greenhouses scheduled to be harvested during a second time period, the second time period after the first time period, are ready to be harvested during the first time period; and
at least partly in response to determining that crops from the one or more greenhouses scheduled to be harvested during the second time period are ready to be harvested during the first time period, cause at least a portion of the crops from the one or more greenhouses scheduled to be harvested during the second time period that are ready to be harvested during the first time period to be harvested during the first time period.

3. The networked greenhouse control system as defined in claim 1, wherein the networked greenhouse control system is configured to:
access images captured by an unmanned vehicle while navigating a first greenhouse;
use a learning engine to determine sizes and colors of at least a portion of the crops in the first greenhouse, the learning engine comprising an input layer, an output layer, and one or more hidden layers comprising nodes associated with weights;
determine, for a first time period, whether available crops from the first greenhouse is less than demand for crops from the first greenhouse;
based at least in part on the crop sizes, determined using the learning engine, determine whether crops in the first greenhouse, scheduled to be harvested during a second time period, the second time period after the first time period, will be ready to harvest during the first time period;
at least partly in response to determining that crops from the first greenhouse scheduled to be harvested during the second time period are ready to be harvested during the first time period, cause at least a portion of the crops from the first greenhouse scheduled to be harvested during the second time period that are ready to be harvested during the first time period, to be harvested during the first time period.

4. The networked greenhouse control system as defined in claim 1, wherein the networked greenhouse control system is configured to:
generate pesticide application instructions for at least a first greenhouse based at least in part on demand planning predictions from the demand planning engine; and
transmit the pesticide application instructions to a greenhouse computer system associated with the first greenhouse to effect execution of the pesticide application instructions.

5. The networked greenhouse control system as defined in claim 1, wherein the networked greenhouse control system is configured to:
generate a dump report populated with a time period identifier, a sow date, a crop identifier, quantity data, a dump date, and a reason for dumping.

6. The networked greenhouse control system as defined in claim 1, wherein the networked greenhouse control system is configured to:
use the demand planning engine to predict demand for greenhouse crops based in part on crop order data from a direct to store delivery online order.

7. The networked greenhouse control system as defined in claim 1, wherein the networked greenhouse control system is configured to:
dynamically generate spacing instructions for at least one greenhouse, wherein the spacing instructions comprise plant spacing execution operations assigned to one or more instructions executors.

8. The networked greenhouse control system as defined in claim 1, wherein the networked greenhouse control system is configured to:
generate a sow report interface configured to be populated with a time period identifier, a sow date, a crop identifier, and a tray type; and
use data used to populate the sow report to generate an available greenhouse inventory report.

9. The networked greenhouse control system as defined in claim 1, wherein the networked greenhouse control system is configured to:
generate an electronic crop availability document indicating predicted availability of quantities of different crops at a plurality of different time periods.

10. The networked greenhouse control system as defined in claim 1, wherein the networked greenhouse control system is configured to:
generate an electronic demand planning document, indicating for a plurality of different crops, in what time period a given crop, in the plurality of different crops, is to be harvested and indicating how much of the given crop is to be harvested, and a rolling demand factor for the given crop.

11. The networked greenhouse control system as defined in claim 1, wherein the networked greenhouse control system is configured to:
provide a first user interface configured to enable an authorized user to individually specify for a plurality of different customers which crops are to be available for acquisition for respective customers and which crops are not to be available for acquisition for respective customers;
receive, via the first user interface a first specification for a first customer indicating a first set of crops that are to be available for acquisition by the first customer, and a second set of crops that are not to be available for acquisition by the first customer;
receive, via the first user interface a first specification for a first customer indicating a first set of crops that are to be available for acquisition by the first customer, and a second set of crops that are not to be available for acquisition by the first customer;
receive, via the first user interface a second specification for a second customer indicating a third set of crops that are to be available for acquisition by the first customer, and a fourth set of crops that are not to be available for acquisition by the first customer, wherein the first set is different than the third set, and the second set is different than the fourth set;
provide a first crop order form for display on a display of the first customer, the first crop order form including entries for the first set of crops and excluding entries for the second set of crops; and
provide a second crop order form for display on a display of the second customer, the second crop order form including entries for the third set of crops and excluding entries for the fourth set of crops.

12. The networked greenhouse control system as defined in claim 1, wherein the networked greenhouse control system is configured to predict crop availability for one or more periods of times based at least in part greenhouse sensor readings, comprising temperature sensor readings, moisture sensor readings, ph sensor readings, and $CO_2$ sensor readings.

13. The networked greenhouse control system as defined in claim 1, wherein the networked greenhouse control system is configured to:
generate demand planning predictions using imported customer-supplied forecasting data.

14. A computerized method configured to enhance greenhouse picking performance, the method comprising:
receiving over a network from respective terminals at a first computer system comprising one or more computing devices, orders for crops;
predicting, using the first computer system, demand for crops based at least in part on the orders for crops received over the network from respective terminals;
based at least in part on the predicted demand for crops predicted using the computer system, generating crop production instructions regarding one or more crops,
wherein the generated crop products instructions include at least crop sowing instructions and/or crop picking instructions configured to cause crops to be respectively sown or picked in one or more greenhouses;
transmitting the crop production instructions over the network to a greenhouse computer system;
generating using the first computer system, based at least in part on the orders for crops received over the network, loading instructions comprising instructions to load specified quantities of crop packs for shipment to a destination; and
transmitting, over the network, the loading instructions to the greenhouse computer system to cause crops to be loaded accordance with the loading instructions.

15. The computerized method as defined in claim 14, the method further comprising:
determining, for a first time period, whether available crops from one or more greenhouses are less than demand for crops from the one or more greenhouses;
at least partly in response to determining for the first time period that available crops from the one or more greenhouses are less than demand for crops from the one or more greenhouses, determining if crops from the one or more greenhouses scheduled to be harvested during a second time period, the second time period after the first time period, are ready to be harvested during the first time period; and
at least partly in response to determining that crops from the one or more greenhouses scheduled to be harvested during the second time period are ready to be harvested during the first time period, causing at least a portion of the crops from the one or more greenhouses scheduled to be harvested during the second time period that are ready to be harvested during the first time period to be harvested during the first time period.

16. The computerized method as defined in claim 14, the method further comprising:
accessing images captured by an unmanned vehicle while navigating a first greenhouse;
using a learning engine to determine sizes of at least a portion of the crops in the first greenhouse, the learning engine comprising an input layer, an output layer, and one or more hidden layers comprising nodes associated with weights;
determining, for a first time period, whether available crops from the first greenhouse is less than demand for crops from the first greenhouse;
based at least in part on the crop sizes, determined using the learning engine, determining whether crops in the first greenhouse, scheduled to be harvested during a second time period, the second time period after the first time period, will be ready to harvest during the first time period;
at least partly in response to determining that crops from the first greenhouse scheduled to be harvested during the second time period are ready to be harvested during the first time period, causing at least a portion of the crops from the first greenhouse scheduled to be harvested during the second time period that are ready to be harvested during the first time period, to be harvested during the first time period.

17. The computerized method as defined in claim 14, the method further comprising:
generating pesticide application instructions for at least a first greenhouse based at least in part on demand planning predictions; and
transmitting the pesticide application instructions to a greenhouse computer system associated with the first greenhouse to effect execution of the pesticide application instructions.

18. The computerized method as defined in claim 14, the method further comprising:
generating a dump report populated with a time period identifier, a sow date, a crop identifier, quantity data, a dump date, and a reason for dumping.

19. The computerized method as defined in claim 14, the method further comprising:
predicting demand for crops based in part on crop order data from a direct to store delivery online order.

20. The computerized method as defined in claim 14, the method further comprising:
dynamically generating spacing instructions for at least one greenhouse, wherein the spacing instructions comprise plant spacing execution operations assigned to one or more instructions executors.

21. The computerized method as defined in claim 14, the method further comprising:
generating a sow report interface configured to be populated with a time period identifier, a sow date, a crop identifier, and a tray type; and
generating an available greenhouse inventory report using data used to populate the sow report to.

22. The computerized method as defined in claim 14, the method further comprising:
generating an electronic crop availability document indicating predicted availability of quantities of different crops at a plurality of different time periods.

23. The computerized method as defined in claim 14, the method further comprising:
generating an electronic demand planning document, indicating for a plurality of different crops, in what time period a given crop, in the plurality of different crops, is to be harvested and indicating how much of the given crop is to be harvested, and a rolling demand factor for the given crop.

24. The computerized method as defined in claim 14, the method further comprising:
providing a first user interface configured to enable an authorized user to individually specify for a plurality of different customers which crops are to be available for acquisition for respective customers and which crops are not to be available for acquisition for respective customers;
receiving, via the first user interface a first specification for a first customer indicating a first set of crops that are to be available for acquisition by the first customer, and a second set of crops that are not to be available for acquisition by the first customer;
receiving, via the first user interface a first specification for a first customer indicating a first set of crops that are to be available for acquisition by the first customer, and a second set of crops that are not to be available for acquisition by the first customer;
receiving, via the first user interface a second specification for a second customer indicating a third set of crops that are to be available for acquisition by the first customer, and a fourth set of crops that are not to be available for acquisition by the first customer, wherein the first set is different than the third set, and the second set is different than the fourth set;
providing a first crop order form for display on a display of the first customer, the first crop order form including entries for the first set of crops and excluding entries for the second set of crops; and
providing a second crop order form for display on a display of the second customer, the second crop order form including entries for the third set of crops and excluding entries for the fourth set of crops.

25. The computerized method as defined in claim 14, the method further comprising predicting crop availability for one or more periods of times based at least in part greenhouse sensor readings, comprising moisture sensor readings, ph sensor readings, and $CO_2$ sensor readings.

26. The computerized method as defined in claim 14, the method further comprising:
generating demand planning predictions using imported customer-supplied forecasting data.

* * * * *